(12) United States Patent
Pezeshki et al.

(10) Patent No.: US 12,144,000 B2
(45) Date of Patent: Nov. 12, 2024

(54) TECHNIQUES FOR COMMON BEAM UPDATES INDICATED BY COMMON DOWNLINK CONTROL INFORMATION

(71) Applicant: QUALCOMM Incorporated, San Diego, CA (US)

(72) Inventors: Hamed Pezeshki, San Diego, CA (US); Yan Zhou, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 382 days.

(21) Appl. No.: 17/536,779

(22) Filed: Nov. 29, 2021

(65) Prior Publication Data

US 2022/0225299 A1    Jul. 14, 2022

Related U.S. Application Data

(60) Provisional application No. 63/137,609, filed on Jan. 14, 2021.

(51) Int. Cl.
*H04W 72/23* (2023.01)
*H04W 72/044* (2023.01)

(52) U.S. Cl.
CPC ......... *H04W 72/23* (2023.01); *H04W 72/046* (2013.01)

(58) Field of Classification Search
CPC ............................ H04W 72/23; H04W 72/046
USPC ......................................................... 370/329
See application file for complete search history.

(56) References Cited

U.S. PATENT DOCUMENTS

| 10,735,157 | B2 * | 8/2020 | Liu | H04W 72/046 |
|---|---|---|---|---|
| 11,271,699 | B1 * | 3/2022 | Eyuboglu | H04L 25/0226 |
| 11,272,532 | B2 * | 3/2022 | Jeon | H04W 74/006 |
| 2005/0101354 | A1 * | 5/2005 | Yang | H04B 7/0617 455/562.1 |
| 2013/0121195 | A1 * | 5/2013 | Sundaresan | H04W 72/542 370/252 |
| 2017/0012724 | A1 * | 1/2017 | Zirwas | H04B 17/373 |
| 2018/0176945 | A1 * | 6/2018 | Cao | H04L 1/1877 |
| 2019/0199412 | A1 * | 6/2019 | Koskela | H04B 7/0695 |
| 2020/0404684 | A1 * | 12/2020 | Lee | H04L 1/1896 |
| 2021/0120538 | A1 * | 4/2021 | Huh | H04W 72/046 |
| 2021/0160839 | A1 * | 5/2021 | Ma | H04L 1/1854 |
| 2021/0281296 | A1 * | 9/2021 | Koskela | H04B 7/0417 |
| 2022/0225299 | A1 * | 7/2022 | Pezeshki | H04L 5/0053 |

(Continued)

FOREIGN PATENT DOCUMENTS

| CN | 112640321 A | * | 4/2021 | ............. H04B 7/024 |
|---|---|---|---|---|
| WO | WO-2018056728 A1 | * | 3/2018 | ........... H04B 7/0617 |

*Primary Examiner* — Anthony Mejia
(74) *Attorney, Agent, or Firm* — Holland & Hart LLP

(57) ABSTRACT

Methods, systems, and devices for wireless communications are described. A user equipment (UE) may be configured to receive, from a base station, a common downlink control information (DCI) message indicating an update to a common beam which applies to a set of UEs, where for each UE of the set of UEs the common beam is shared across a set of channels, a set of reference signals, or both. The UE may receive, via the common DCI message, an indication of the set of UEs associated with the update to the common beam. The UE may then perform at least one beam switching procedure to update the common beam at the UE based on receiving the common DCI message and the UE being included within the set of UEs.

30 Claims, 15 Drawing Sheets

(56) References Cited

U.S. PATENT DOCUMENTS

2023/0328830 A1* 10/2023 Yi .................... H04W 76/19
370/329

* cited by examiner

TECHNIQUES FOR COMMON BEAM UPDATES INDICATED BY COMMON DOWNLINK CONTROL INFORMATION

CROSS REFERENCE

The present application for patent claims the benefit of U.S. Provisional Patent Application No. 63/137,609 by PEZESHKI et al., entitled "TECHNIQUES FOR COMMON BEAM UPDATES INDICATED BY COMMON DOWNLINK CONTROL INFORMATION," filed Jan. 14, 2021, assigned to the assignee hereof, and expressly incorporated by reference herein.

FIELD OF TECHNOLOGY

The following relates to wireless communications, including techniques for common beam updates indicated by common downlink control information (DCI).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may enable the network (e.g., base stations) to update beams used for communications at a UE via downlink control information (DCI) messages.

SUMMARY

The described techniques relate to improved methods, systems, devices, and apparatuses that support techniques for common beam updates indicated by common downlink control information (DCI). Generally, aspects of the present disclosure provide techniques for signaling common beam updates across a set of user equipments (UEs) via a single common DCI message (e.g., group-common DCI (GC-DCI) message). For example, a UE may receive a GC-DCI indicating a common beam update across a set of UEs. Subsequently, upon identifying that the UE is included within the set of UEs, the UE may perform one or more beam switching procedures to update the common beam in accordance with the GC-DCI.

A method for wireless communication at a UE is described. The method may include receiving, from a base station, a common DCI message indicating an update to a common beam which applies to a set of multiple UEs, where for each UE of the set of multiple UEs the common beam is shared across a set of multiple channels, a set of multiple reference signals, or both, receiving, via the common DCI message, an indication of the set of multiple UEs associated with the update to the common beam, and performing at least one beam switching procedure to update the common beam at the UE based on receiving the common DCI message and the UE being included within the set of multiple UEs.

An apparatus for wireless communication at a UE is described. The apparatus may include a processor, memory in electronic communication with the processor, and instructions stored in the memory. The instructions may be executable by the processor to cause the apparatus to receive, from a base station, a common DCI message indicating an update to a common beam which applies to a set of multiple UEs, where for each UE of the set of multiple UEs the common beam is shared across a set of multiple channels, a set of multiple reference signals, or both, receive, via the common DCI message, an indication of the set of multiple UEs associated with the update to the common beam, and perform at least one beam switching procedure to update the common beam at the UE based on receiving the common DCI message and the UE being included within the set of multiple UEs.

Another apparatus for wireless communication at a UE is described. The apparatus may include means for receiving, from a base station, a common DCI message indicating an update to a common beam which applies to a set of multiple UEs, where for each UE of the set of multiple UEs the common beam is shared across a set of multiple channels, a set of multiple reference signals, or both, means for receiving, via the common DCI message, an indication of the set of multiple UEs associated with the update to the common beam, and means for performing at least one beam switching procedure to update the common beam at the UE based on receiving the common DCI message and the UE being included within the set of multiple UEs.

A non-transitory computer-readable medium storing code for wireless communication at a UE is described. The code may include instructions executable by a processor to receive, from a base station, a common DCI message indicating an update to a common beam which applies to a set of multiple UEs, where for each UE of the set of multiple UEs the common beam is shared across a set of multiple channels, a set of multiple reference signals, or both, receive, via the common DCI message, an indication of the set of multiple UEs associated with the update to the common beam, and perform at least one beam switching procedure to update the common beam at the UE based on receiving the common DCI message and the UE being included within the set of multiple UEs.

Some examples of the method, apparatuses, and non-transitory computer-readable medium described herein may further include operations, features, means, or instructions for receiving, via the common DCI message, a transmission-configuration indicator (TCI) state associated with the update to the common beam at each UE of the set of multiple UEs, where performance of the at least one beam switching procedure may be based on the TCI state.

Some examples of the method, apparatuses, and non-transitory computer-readable medium described herein may further include operations, features, means, or instructions for receiving, via the common DCI message, a first TCI state associated with the update to the common beam at a first subset of UEs of the set of multiple UEs, receiving, via the common DCI message, a second TCI state associated with the update to the common beam at a second subset of UEs of the set of multiple UEs, and identifying that the UE may be included within the first subset of UEs or the second subset of UEs, where performance of the at least one beam switching procedure may be based on the first TCI state or the second TCI state which may be associated with the first subset of UEs or the second subset of UEs within which the UE may be included.

Some examples of the method, apparatuses, and non-transitory computer-readable medium described herein may further include operations, features, means, or instructions for receiving, via the common DCI message, a bitmap indicating the first subset of UEs, the second subset of UEs, or both, where the identifying may be based on the bitmap.

Some examples of the method, apparatuses, and non-transitory computer-readable medium described herein may further include operations, features, means, or instructions for receiving, via the common DCI message, a validity period associated with the update to the common beam and at least a subset of the set of multiple UEs and communicating with the base station using the common beam for at least a duration of the validity period and based on the UE being included within the at least the subset of the set of multiple UEs.

Some examples of the method, apparatuses, and non-transitory computer-readable medium described herein may further include operations, features, means, or instructions for transmitting a feedback message to the base station in response to receiving the common DCI message, where the duration of the validity period may be based on transmitting the feedback message.

In some examples of the method, apparatuses, and non-transitory computer-readable medium described herein, the duration of the validity period may be based on receiving the common DCI message.

Some examples of the method, apparatuses, and non-transitory computer-readable medium described herein may further include operations, features, means, or instructions for receiving, from the base station, a control message indicating a set of resources for transmitting a feedback message responsive to the common DCI message and transmitting, to the base station, the feedback message within the set of resources and in response to the common DCI message.

In some examples of the method, apparatuses, and non-transitory computer-readable medium described herein, the control message includes the common DCI message, a medium access control (MAC) control element (MAC-CE) message, a radio resource control (RRC) message, or any combination thereof.

Some examples of the method, apparatuses, and non-transitory computer-readable medium described herein may further include operations, features, means, or instructions for receiving an additional common DCI message indicating the update to the common beam and transmitting, to the base station, a feedback message based on identifying that the UE failed to successfully decode the additional common DCI message, where the common DCI message may be received in response to the feedback message.

Some examples of the method, apparatuses, and non-transitory computer-readable medium described herein may further include operations, features, means, or instructions for transmitting a feedback message to the base station based on identifying that the UE successfully decoded the common DCI message.

In some examples of the method, apparatuses, and non-transitory computer-readable medium described herein, for each UE of the set of multiple UEs the common beam may be shared across a downlink channel and an uplink channel.

In some examples of the method, apparatuses, and non-transitory computer-readable medium described herein, for each UE of the set of multiple UEs the common beam may be shared across a first downlink channel and a second downlink channel.

In some examples of the method, apparatuses, and non-transitory computer-readable medium described herein, for each UE of the set of multiple UEs the common beam may be shared across a first uplink channel and a second uplink channel.

In some examples of the method, apparatuses, and non-transitory computer-readable medium described herein, the common DCI message includes a GC-DCI message.

A method for wireless communication at a base station is described. The method may include transmitting a common DCI message indicating an update to a common beam which applies to a set of multiple UEs, where for each UE of the set of multiple UEs the common beam is shared across a set of multiple channels, a set of multiple reference signals, or both, transmitting, via the common DCI message, an indication of the set of multiple UEs associated with the update to the common beam, and communicating with the set of multiple UEs based on transmitting the common DCI message.

An apparatus for wireless communication at a base station is described. The apparatus may include a processor, memory in electronic communication with the processor, and instructions stored in the memory. The instructions may be executable by the processor to cause the apparatus to transmit a common DCI message indicating an update to a common beam which applies to a set of multiple UEs, where for each UE of the set of multiple UEs the common beam is shared across a set of multiple channels, a set of multiple reference signals, or both, transmit, via the common DCI message, an indication of the set of multiple UEs associated with the update to the common beam, and communicate with the set of multiple UEs based on transmitting the common DCI message.

Another apparatus for wireless communication at a base station is described. The apparatus may include means for transmitting a common DCI message indicating an update to a common beam which applies to a set of multiple UEs, where for each UE of the set of multiple UEs the common beam is shared across a set of multiple channels, a set of multiple reference signals, or both, means for transmitting, via the common DCI message, an indication of the set of multiple UEs associated with the update to the common beam, and means for communicating with the set of multiple UEs based on transmitting the common DCI message.

A non-transitory computer-readable medium storing code for wireless communication at a base station is described. The code may include instructions executable by a processor to transmit a common DCI message indicating an update to a common beam which applies to a set of multiple UEs, where for each UE of the set of multiple UEs the common beam is shared across a set of multiple channels, a set of multiple reference signals, or both, transmit, via the common DCI message, an indication of the set of multiple UEs associated with the update to the common beam, and communicate with the set of multiple UEs based on transmitting the common DCI message.

Some examples of the method, apparatuses, and non-transitory computer-readable medium described herein may further include operations, features, means, or instructions for transmitting, via the common DCI message, a TCI state associated with the update to the common beam at each UE of the set of multiple UEs, where communicating with the set of multiple UEs may be based on the TCI state.

Some examples of the method, apparatuses, and non-transitory computer-readable medium described herein may further include operations, features, means, or instructions for transmitting, via the common DCI message, a first TCI state associated with the update to the common beam at a first subset of UEs of the set of multiple UEs, where communicating with the first subset of UEs may be based on the first TCI state and transmitting, via the common DCI message, a second TCI state associated with the update to the common beam at a second subset of UEs of the set of multiple UEs, where communicating with the second subset of UEs may be based on the second TCI state.

Some examples of the method, apparatuses, and non-transitory computer-readable medium described herein may further include operations, features, means, or instructions for transmitting, via the common DCI message, a bitmap indicating the first subset of UEs, the second subset of UEs, or both, where communicating with the set of multiple UEs may be based on the bitmap.

Some examples of the method, apparatuses, and non-transitory computer-readable medium described herein may further include operations, features, means, or instructions for transmitting, via the common DCI message, a validity period associated with the update to the common beam and at least a subset of the set of multiple UEs and communicating with the at least the subset of the set of multiple UEs for at least a duration of the validity period.

Some examples of the method, apparatuses, and non-transitory computer-readable medium described herein may further include operations, features, means, or instructions for receiving a feedback message to the base station in response to transmitting the common DCI message, where the duration of the validity period may be based on transmitting the feedback message.

In some examples of the method, apparatuses, and non-transitory computer-readable medium described herein, the duration of the validity period may be based on transmitting the common DCI message.

Some examples of the method, apparatuses, and non-transitory computer-readable medium described herein may further include operations, features, means, or instructions for transmitting, to the set of multiple UEs, a control message indicating a set of resources for transmitting feedback messages responsive to the common DCI message and receiving, from a UE of the set of multiple UEs, a feedback message within the set of resources and in response to the common DCI message.

In some examples of the method, apparatuses, and non-transitory computer-readable medium described herein, the control message includes the common DCI message, a MAC-CE message, an RRC message, or any combination thereof.

Some examples of the method, apparatuses, and non-transitory computer-readable medium described herein may further include operations, features, means, or instructions for receiving, from a UE of the set of multiple UEs, a feedback message indicating that the UE failed to successfully decode the common DCI message and transmitting an additional DCI message based on receiving the feedback message.

In some examples of the method, apparatuses, and non-transitory computer-readable medium described herein, the additional DCI message includes an additional common DCI message.

Some examples of the method, apparatuses, and non-transitory computer-readable medium described herein may further include operations, features, means, or instructions for receiving a feedback message from each UE of the set of multiple UEs indicating that each UE of the set of multiple UEs successfully decoded the common DCI message.

Some examples of the method, apparatuses, and non-transitory computer-readable medium described herein may further include operations, features, means, or instructions for receiving a feedback message from a first subset of UEs of the set of multiple UEs indicating that each UE of the first subset of UEs successfully decoded the common DCI message, identifying that a second subset of UEs of the set of multiple UEs did not transmit a feedback message, and transmitting an additional common DCI message based on the identifying.

In some examples of the method, apparatuses, and non-transitory computer-readable medium described herein, for each UE of the set of multiple UEs the common beam may be shared across a downlink channel and an uplink channel.

In some examples of the method, apparatuses, and non-transitory computer-readable medium described herein, for each UE of the set of multiple UEs the common beam may be shared across a first downlink channel and a second downlink channel.

In some examples of the method, apparatuses, and non-transitory computer-readable medium described herein, for each UE of the set of multiple UEs the common beam may be shared across a first uplink channel and a second uplink channel.

In some examples of the method, apparatuses, and non-transitory computer-readable medium described herein, the common DCI message includes a GC-DCI message.

DETAILED DESCRIPTION

Figure 1:
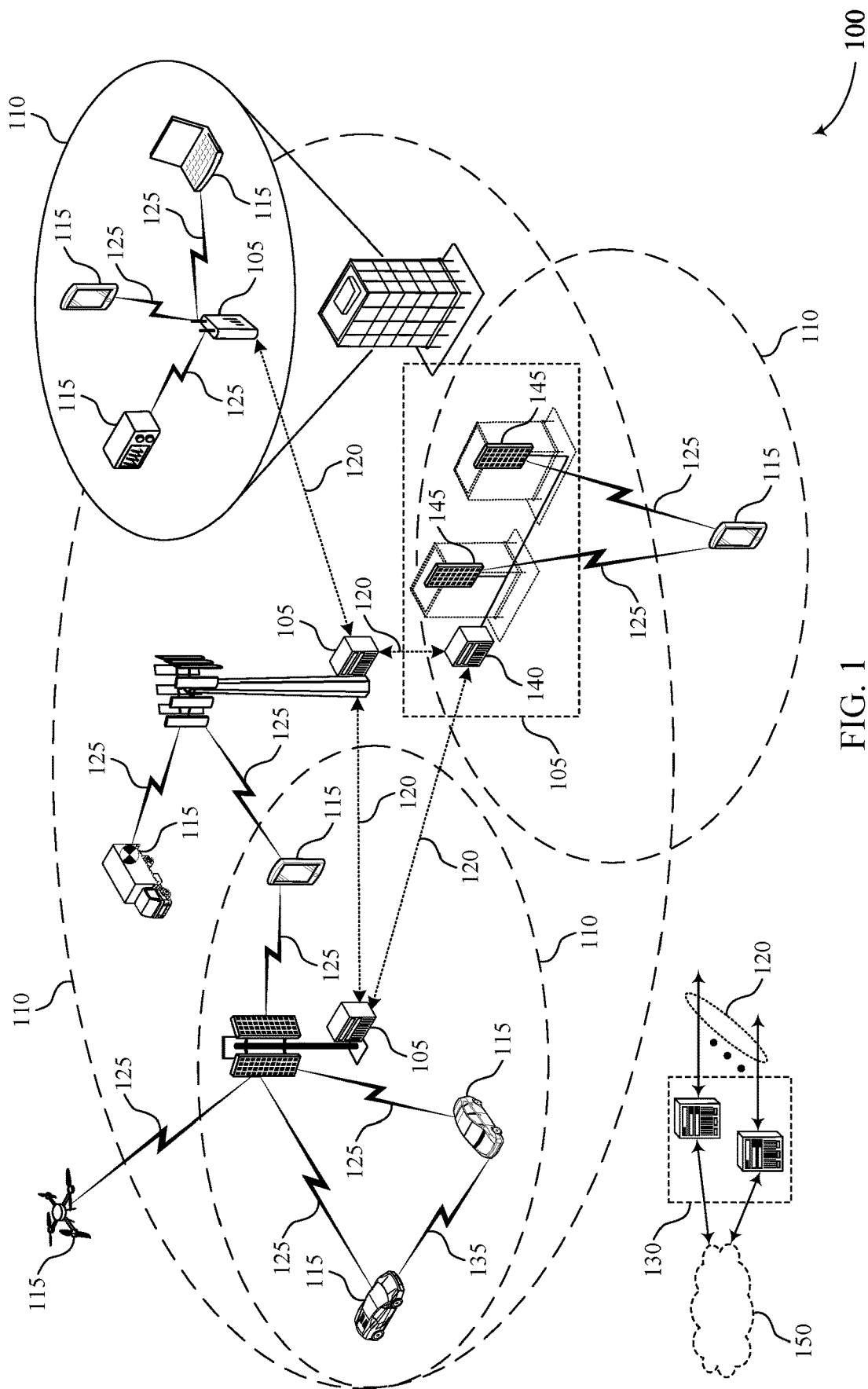
FIG. 1 illustrates an example of a wireless communications system that supports techniques for common beam updates indicated by common downlink control information (DCI) in accordance with aspects of the present disclosure.

Some wireless communications systems may enable a network (e.g., base stations) to update beams used for communications at a user equipment (UE) via downlink control information (DCI) messages. DCI messages may indicate transmission-configuration indicator (TCI) states which instruct a UE to update a beam used by the UE. In some wireless communications systems, a single DCI message may be configured to update multiple beams at a UE. In particular, a single DCI message may indicate a common TCI state which updates a common beam at a UE, where the common beam is shared across multiple channels, multiple reference signals, or both. For example, a DCI may include a common TCI state which updates a common beam at the UE that is used for an uplink channel and a downlink channel, multiple uplink channels, multiple downlink channels, or any combination thereof.

Enabling a single DCI message to update multiple beams (e.g., a common beam) at a UE may reduce control signaling overhead within a wireless communications system. However, some wireless communications systems do not enable common beams to be updated across multiple UEs using a single DCI message. In this regard, if the network is to update a common beam across three separate UEs, the network would be led to transmit three separate DCI messages, which may increase control signaling overhead within the network.

Accordingly, aspects of the present disclosure provide techniques for signaling common beam updates across a set of UEs via a single common DCI message (e.g., group-common DCI (GC-DCI) message). For example, a UE may receive a GC-DCI indicating a common beam update across a set of UEs. Subsequently, upon identifying that the UE is included within the set of UEs, the UE may perform one or more beam switching procedures to update the common beam in accordance with the GC-DCI.

In some aspects, the GC-DCI may indicate a common TCI state which is to be used for the common beam update at each UE of the set of UEs. Additionally or alternatively, the GC-DCI may include multiple common TCI states, where subsets of UEs are to perform the common beam update using one of the multiple common TCI states (e.g., first common TCI state for first subset of UEs, second common TCI state for second subset of UEs). In some aspects, the UEs which receive the GC-DCI may be configured (e.g., pre-configured, or via control signaling) to transmit feedback messages (e.g., positive acknowledgment (ACK) messages, negative acknowledgement (NACK) messages) according to varying feedback configurations (e.g., NACK only, both ACK/NACK, using pre-configured resources). Similarly, the base station which transmitted the GC-DCI may be configured to re-transmit (or refrain from transmitting) the GC-DCI according to varying feedback configurations. For example, in some cases, the base station may refrain from re-transmitting the GC-DCI if no NACK is received, if an ACK is received from each UE of the set of UEs, or both.

By enabling common beams to be updated across a set of UEs via a single common DCI message (e.g., GC-DCI message), the techniques described herein may enable the network to update common beams across multiple UEs with less control signaling. In this regard, techniques described herein may thereby reduce control signaling overhead and improve resource utilization in the wireless communications system. The ability to update a common beam for a set of UEs with a single DCI (e.g., single GC-DCI) may be particularly useful in cases where groups of UEs are traveling close to one another, such as on a train or in a bus. Moreover, by indicating updates to common beams across multiple UEs simultaneously (e.g., via a single GC-DCI message), techniques described herein may improve the speed and efficiency with which common beams may be updated at UEs within a wireless communications system, thereby improving the efficiency of wireless communications within the wireless communications system.

Aspects of the disclosure are initially described in the context of wireless communications systems. Additional aspects of the disclosure are described in the context of an example process flow. Aspects of the disclosure are further illustrated by and described with reference to apparatus diagrams, system diagrams, and flowcharts that relate to techniques for common beam updates indicated by common DCI.

FIG. 1 illustrates an example of a wireless communications system 100 that supports techniques for common beam updates indicated by common DCI in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

According to some implementations, downlink beamforming at a base station 105 may be performed such that the beamforming is transparent to a UE 115, and vice versa. That is, when performing downlink beamforming at a base station 105-b, a UE 115 may not know what beam is used at the base station 105. In cases where the wireless communications system 100 supports NR, the wireless communications system 100 may also support signaling for beam indications. In practice, a base station 105 may inform a UE 115 that a respective physical downlink shared channel (PDSCH) or physical downlink control channel (PDCCH) transmission uses the same transmission beam as a configured reference signal (e.g., CSI-RS, synchronization signal block). Moreover, beam indications may be used to inform a UE 115 that a respective PDSCH or PDCCH is transmitted using the same spatial filter as the configured reference signal.

As noted previously herein, beam indications may be based on configurations and signaling TCI states. Each TCI state may include information associated with one or more beams, including information regarding reference signals (e.g., CSI-RS, synchronization signal block), quasi co-location (QCL) configurations, spatial filters, and the like. In this regard, associating transmissions (e.g., reference signals, PDCCH transmissions, PDSCH transmissions) with a given TCI state may indicate, to other wireless devices, that the respective transmission was performed using a spatial filter associated with the TCI state.

In some cases, a wireless device (e.g., UE 115) may be configured with up to sixty-four candidate TCI states. RRC signaling may be used to assign candidate TCI states for each configured CORESET for PDCCH transmissions. Subsequently, after configuring candidate TCI states via RRC signaling, MAC signaling may be used to dynamically indicate a specific TCI state, within each CORESET-configured subset, which is to be activated. As such, once a receiving device (e.g., UE 115o has determined a suitable receiver-side beam direction for reception of the reference signals, the receiving device may be configured to use the same beam (e.g., same beam direction) for other transmissions, such as PDCCH transmissions.

In the context of PDSCH transmissions, there are two alternatives for indicating beam indicators. The indication of beam indicators for PDSCH transmissions may depend on the scheduling offset of the respective PDSCH transmission (e.g., scheduling offset of the PDSCH transmission relative to the corresponding PDCCH transmission scheduling the PDSCH transmission). If this scheduling offset is larger than N symbols, the DCI message scheduling the PDSCH transmission may explicitly indicate the TCI state for the PDSCH transmission. In such cases, the UE 115 may be pre-configured (e.g., via RRC signaling) with up to eight TCI states from a set of candidate TCI states, and the DCI message may include an indication (e.g., three-bit indicator) of the active TCI state from the set of TCI states which is to be activated for the PDSCH transmission. Comparatively, if the scheduling offset of a PDSCH transmission is less than or equal to N symbols, a UE 115 may be configured to determine that the PDSCH transmission is QCL with the corresponding PDCCH transmission scheduling the PDSCH transmission. In other words, the UE 115 may be configured to determine that the TCI state indicated via MAC signaling is also valid for the PDSCH transmission. The varying techniques for determining TCI states relative to the scheduling offset may be based on a processing time at the UE 115 which may be used for decoding the TCI information and performing beam switching procedures in order to receive the PDSCH transmission.

In some aspects, the UEs 115 and the base stations 105 of the wireless communications system 100 may support techniques for signaling common beam updates across a set of UEs 115 via a single common DCI message (e.g., GC-DCI message). For example, a UE 115 of the wireless communications system 100 may receive, from a base station 105, a common DCI message (e.g., GC-DCI message) indicating a common beam update across a set of UEs 115. Subsequently, upon identifying that the UE 115 is included within the set of UEs 115 indicated via the common DCI message, the UE 115 may perform one or more beam switching procedures to update the common beam in accordance with the common DCI message.

In some aspects, the common DCI message may indicate a common TCI state which is to be used for the common beam update at each UE 115 of the set of UEs 115. Additionally or alternatively, the common DCI message may include multiple common TCI states, where subsets of UEs 115 are to perform the common beam update using one of the multiple common TCI states. For example, the common DCI message may indicate a first common TCI state for updating the common beam at a first subset of the set of UEs 115, and a second common TCI state for updating the common beam at a second subset of the set of UEs 115.

In some aspects, the UEs 115 which receive the common DCI message may be configured (e.g., pre-configured, or via control signaling) to transmit feedback messages (e.g., ACK/NACK) according to varying feedback configurations (e.g., NACK only, both ACK/NACK, using pre-configured resources). Similarly, the base station 105 which transmitted the common DCI message may be configured to re-transmit (or refrain from transmitting) the common DCI message according to varying feedback configurations. For example, in some cases, the base station 105 may refrain from re-transmitting the common DCI message if no NACK is received from any UE 115 of the set of UEs 115, if an ACK is received from each UE 115 of the set of UEs 115, or both.

Techniques described herein may enable common beams to be updated across a set of UEs 115 via a single common DCI message (e.g., GC-DCI message), the techniques described herein may enable the network to update common beams across multiple UEs 115 with less control signaling. In this regard, techniques described herein may thereby reduce control signaling overhead and improve resource utilization in the wireless communications system 100. The ability to update a common beam for a set of UEs 115 with a single common DCI message (e.g., GC-DCI message) may be particularly useful in cases where groups of UEs 115 are traveling close to one another, such as on a train or in a bus. Moreover, by indicating updates to common beams across multiple UEs 115 simultaneously (e.g., via a single GC-DCI message), techniques described herein may improve the speed and efficiency with which common beams may be updated at UEs 115 within a wireless communications system 100, thereby improving the efficiency of wireless communications within the wireless communications system 100.

Figure 2:
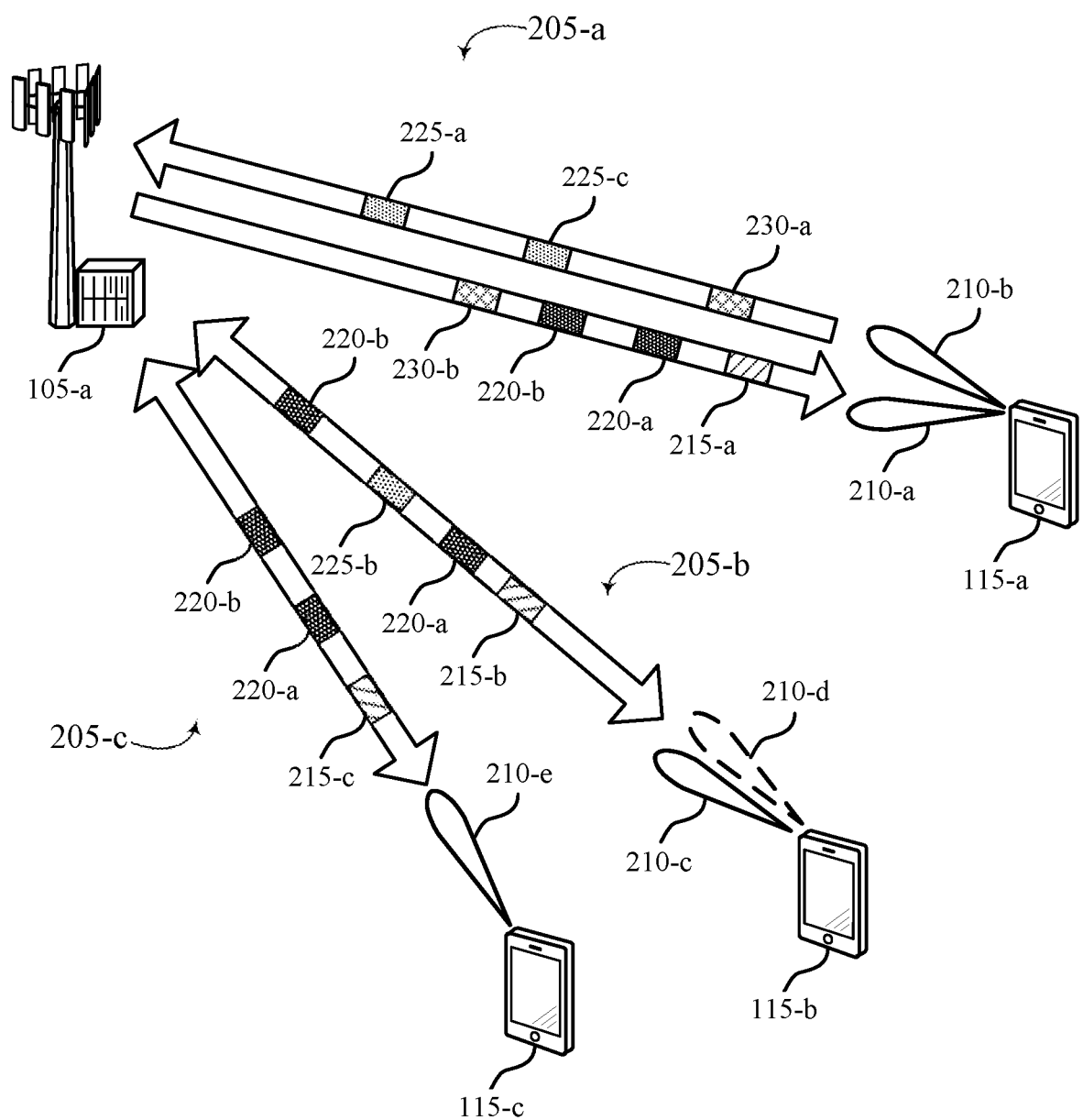
FIG. 2 illustrates an example of a wireless communications system that supports techniques for common beam updates indicated by common DCI in accordance with aspects of the present disclosure.

FIG. 2 illustrates an example of a wireless communications system 200 that supports techniques for common beam updates indicated by common DCI in accordance with aspects of the present disclosure. In some examples, wireless communications system 200 may implement aspects of wireless communications system 100. The wireless communications system 200 may include a first UE 115-a, a second UE 115-b, a third UE 115-c, and a base station 105-a, which may be examples of UEs 115 and base stations 105, as described with reference to FIG. 1.

In some aspects, the first UE 115-a, the second UE 115-b, and the third UE 115-c may communicate with the base station 105-a via communication link 205-a, communication link 205-b, and communication link 205-c, respectively. In some aspects, the communication links 205 may include examples of access links (e.g., Uu links). The communication links 205 may include bi-directional links that can include both uplink and downlink communication. For example, the first UE 115-a may transmit uplink transmissions, such as uplink control signals or uplink data signals, to the base station 105-a using the communication link 205-a, and the base station 105-a may transmit downlink transmissions, such as downlink control signals or downlink data signals, to the UE 115-a using the communication link 205-a. In some aspects, the wireless communications system 200 may support wireless communications with wireless devices (e.g., UEs 115) via one or more serving cells of the wireless communications system 200. Each serving cell may be supported by one or more base stations 105 of the wireless communications system 200.

In some aspects, the UEs 115 and the base station 105-a may communicate with one another using one or more beams, one or more carriers, one or more communications links, or any combination thereof. In some aspects, the UEs 115 may communicate with the base station 105-a via one or more common beams 210. In some aspects, each common beam 210 may be associated with (e.g., used for) multiple channels, multiple reference signals, or both. For example, the first UE 115-a may be configured to use the common beam 210-a for a downlink channel of the communication link 205-a and an uplink channel of the communication link 205-a. By way of another example, the first UE 115-a may be configured to use the common beam 210-a for multiple downlink channels of the communication link 205-a, multiple uplink channels of the communication link 205-a, or both. Furthermore, the first UE 115-a may be configured to use the common beam 210-a for a first set of reference signals and a second set of reference signals.

In some aspects, the base station 105-a, the UEs 115, or both, may perform directional beamforming for performing transmissions via the communication links 205. The UEs 115 may be configured to perform beam switching procedures to transition from one common beam 210 to another. For example, the first UE 115-a may be configured to communicate using the first common beam 210-a, and may perform a beam switching procedure to transition from the first common beam 210-a to the second common beam 210-b in order to communicate according to the second common beam 210-b. Beam switching procedures may involve processing at the UEs 115, retuning of radio frequency components, or both. In some cases, different beams (e.g., common beams 210) may be configured according to different parameters (e.g., different TCI states, transmission powers).

As noted previously herein, in some wireless communications systems a single DCI message may be capable of updating a single beam at a UE 115. In other wireless communications systems, a single DCI message may be configured to update multiple beams at a UE 115. In particular, a single DCI message may indicate a common TCI state which updates a common beam 210 at a UE 115. Enabling a single DCI message to update multiple beams (e.g., a common beam 210) at a UE may reduce control signaling overhead within a wireless communications system. However, some wireless communications systems do not enable common beams 210 to be updated across multiple UEs 115 using a single DCI message. In this regard, if the base station 105-a were to update a common beam 210 across each of the UEs 115-a, 115-b, and 115-c, the base station 105 would be used to transmit three separate DCI messages, one to each of the respective UEs 115, which may increase control signaling overhead within the network.

Accordingly, aspects of the present disclosure provide techniques for signaling common beam updates across a set of UEs 115 via a single common DCI message (e.g., GC-DCI message). By enabling common beams 210 to be updated across a set of UEs 115 via a single common DCI message (e.g., GC-DCI message), the techniques described herein may enable the wireless communications system 200 to reduce a quantity of control signaling used to implement updates to common beams.

For example, the base station 105-a may transmit a control message 215-a, a control message 215-b, and a control message 215-c to the first UE 115-a, the second UE 115-b, and the third UE 115-c, respectively. The control messages 215 may include, but are not limited to, DCI messages (e.g., common DCI messages, GC-DCI), medium access control control element (MAC-CE) messages, RRC messages, and the like. In some aspects, the control messages 215 may indicate sets of resources for receiving DCI messages (e.g., common DCI messages 220), sets of resources for transmitting feedback messages 225 (e.g., ACK/NACK) responsive to common DCI messages 220, or both. Additionally or alternatively, the control messages 215 may indicate one or more feedback configurations for transmitting feedback messages 225 responsive to common DCI messages 220. In this regard, the control messages 215 may configure the UEs with sets of rules associated with transmitting feedback messages 225.

For example, according to a first feedback configuration, the UEs 115 may be configured to transmit NACK messages in the event that the respective UEs 115 fail to decode a common DCI message 220 (e.g., NACK-only feedback configuration). According to another feedback configuration, the UEs 115 may be configured to transmit both ACK and NACK messages depending on whether a common DCI message 220 is successfully decoded (e.g., ACK/NACK feedback configuration) at the respective UEs 115. In some aspects, the control message 215 may indicate which UEs 115 that receive a common DCI message 220 are to transmit feedback messages 225. For example, according to some feedback configurations, UEs 115 which are included within a set of UEs 115 indicated in a common DCI message 220 may be expected to transmit feedback messages 225. Comparatively, according to some other feedback configurations, all UEs 115 which receive a common DCI message 220 may be expected to transmit feedback messages 225, regardless of whether the respective UEs 115 are included within a set of UEs 115 indicated in the common DCI message 220.

In some aspects, the base station 105-a may transmit a first common DCI message 220-a to the first UE 115-a, the second UE 115-b, the third UE 115-c, or any combination thereof. The UEs 115 may receive the first common DCI message 220-a based on receiving the respective control messages 215. For example, the first UE 115-a may receive the first common DCI message 220-a within the set of resources indicated via the control message 215-a. In some aspects, the first common DCI message 220-a may indicate an update to a common beam 210, where the update to the common beam 210 applies to a set of UEs 115 (e.g., a set of UEs 115 including the first UE 115-a, the second UE 115-b, the third UE 115-c, or any combination thereof). In particular, for each UE 115 of the set of UEs 115, the common beam 210 may be shared across a set of channels (e.g., downlink and uplink channel, multiple downlink channels, multiple uplink channels), a set of reference signals, or both.

The first common DCI message 220-a may include an indication of the set of UEs 115 which are associated with the update to the common beam 210. In this regard, the first common DCI message 220-a may include one or more identifiers (e.g., Rx-IDs) associated with each UE 115 of the set of UEs 115. For example, the first common DCI message 220-a may indicate that the first UE 115-a and the second UE 115-b are included within a set of UEs 115 associated with the common beam 210 update, and may indicate that the third UE 115-c is not included within the set of UEs 115 associated with the common beam 210 update.

The set of UEs 115 associated with the update to the common beam 210 may be indicated via a bitmap included within the first common DCI message 220-a. In some aspects, the first common DCI message 220-a may include a first GC-DCI. The first common DCI message 220-a may be transmitted via L1. Additionally or alternatively, the first common DCI message 220-a may include a multicast transmission, a groupcast transmission, a broadcast transmission, or any combination thereof, transmission, and may include any number of formats for DCI messages (e.g., DCI 1_1, DCI 1_2).

In some aspects, the first common DCI message 220-a may indicate an update to a common beam 210 which is to be performed at each UE 115 of the set of UEs 115. For example, the first common DCI message 220-a may indicate a common TCI state for updating the common beam 210 at each UE 115 of the set of UEs 115. A TCI state may include at least one source reference signal to provide a reference for the UEs 115 to determine a QCL configuration or spatial filter for updating the common beam 210. The common beam 210 which is to be updated in accordance with the first common DCI message 220-a may be shared across multiple channels, multiple reference signals, or both.

In some aspects, by indicating an update to a common beam 210 which is to be performed at each UE 115 of the set of UEs 115, the first common DCI message 220-a may indicate that each UE 115 of the set of UEs 115 (e.g., first UE 115-a and second UE 115-b) is to perform a beam switching procedure to update a common beam 210-a to the second common beam 210-b. For example, the first common DCI message 220-a may indicate a common TCI state for updating the first common beam 210-a at the first UE 115-a, a common TCI state for updating the first common beam 210-b at the second UE 115-b, or both. A TCI state may include at least one source reference signal to provide a reference for the UEs 115 to determine a QCL configuration or spatial filter for updating the common beams 210. The common beams 210 which are to be updated across the set of UEs 115 (e.g., first UE 115-*a*, second UE 115-*b*) in may be shared across multiple channels, multiple reference signals, or both. Moreover, the common beams 210 may be associated with transmissions carried out via a single TRP of the UEs 115 or base station 105-*a*, multiple TRPs of the UEs 115 or base station 105-*a*, a single CORESET, multiple CORESETS, or any combination thereof. For example, the first common beam 210-*a* of the first UE 115-*a* may be shared across a downlink channel and an uplink channel, multiple downlink channels, multiple uplink channels, multiple reference signals, or any combination thereof.

For instance, the first common DCI message 220-*a* may indicate a joint uplink/downlink common TCI state configured to update a common beam 210 shared across a downlink channel and an uplink channel for each UE 115 of the set of UEs 115, shared across two reference signals for each UE 115 of the set of UEs 115, or both. Additionally or alternatively, the first common DCI message 220-*a* may indicate a separate downlink-common TCI state configured to update a common beam 210 shared across two downlink channels, shared across two reference signals, or both. Similarly, the first common DCI message 220-*a* may indicate a separate uplink-common TCI state configured to update a common beam 210 shared across two uplink channels, shared across two reference signals, or both.

In some aspects, source reference signals associated with downlink-common TCI states may provide QCL information for reception of downlink transmissions (e.g., PDSCH transmissions) at the UEs 115, which may be applied for downlink reception on all or a subset of CORESETs within a component carrier. Similarly, source reference signals associated with uplink-common TCI states may provide a reference for determining common uplink transmission spatial filters for grants (e.g., dynamic grants, configured grants) based on uplink transmissions (e.g., physical uplink shared channel (PUSCH) transmissions) at the UEs 115, which may be applied for uplink transmission on all or a subset of physical uplink control channel (PUCCH) resources within a component carrier. In some cases, uplink transmission spatial filters associated with uplink-common TCI states may also apply to all or a subset of sounding reference signal (SRS) resources in a resource set which are configured for antenna switching or uplink transmissions (e.g., codebook-based uplink transmissions, non-codebook-based uplink transmissions). In some cases, the MAC-CE messages may additionally or alternatively be used to activate one or more TCI states.

In some aspects, the UEs 115 may identify a success or failure of the respective UEs 15 in receiving or decoding the first common DCI message 220-*a*. For example, the first UE 115-*a* may identify a failure of the first UE 115-*a* to receive or decode the first common DCI message 220-*a*. Conversely, the second UE 115-*b* and the third UE 115-*c* may identify that the respective UEs 115 successfully decoded the first common DCI message 220-*a*. The UEs 115 may determine whether the respective UEs 115 successfully received or decoded the first common DCI message 220-*a* based on receiving the control message 215, receiving the first common DCI message 220-*a*, or both.

In some aspects, the first UE 115-*a*, the second UE 115-*b*, the third UE 115-*c*, or any combination thereof, may transmit a feedback messages 225 to the base station. The UEs 115 may transmit the feedback messages 225 based on receiving the control message 215, receiving (or failing to receive) the first common DCI message 220-*a*, determining the failure or success for decoding the first common DCI message 220-*a*, or any combination thereof. For example, the UEs 115 may transmit the feedback messages 225 within the set of resources for transmitting feedback messages 225 indicated in the control message 215. In particular, the UEs 115 may transmit (or refrain from transmitting) the feedback messages 225 based on (e.g., in accordance with) the one or more feedback configurations received via the control message 215.

For example, the first UE 115-*a* may transmit a first feedback message 225-*a* (e.g., NACK message) based on identifying that the first UE 115-*a* failed to successfully receive or decode the first common DCI message 220-*a*. The first UE 115-*a* may be configured to transmit the NACK message (e.g., first feedback message 225-*a*) in accordance with a NACK-only feedback configuration, an ACK/NACK feedback configuration, or both. In some cases, a NACK message may serve as a request for the base station 105-*a* to re-transmit the first common DCI message 220-*a*, transmit a new common DCI message 220, or both.

By way of another example, the second UE 115-*b* may transmit a second feedback message 225-*b* (e.g., ACK message) based on identifying that the second UE 115-*b* successfully received and decoded the first common DCI message 220-*a*. The second UE 115-*b* may be configured to transmit the ACK message (e.g., second feedback message 225-*b*) in accordance with an ACK/NACK feedback configuration. Comparatively, in cases where the second UE 115-*b* is configured with a NACK-only feedback configuration, the second UE 115-*b* may refrain from transmitting an ACK message. In some cases, the absence of a NACK message received from the second UE 115-*b* may indicate to the base station 105-*a* that the second UE 115-*b* successfully received and decoded the first common DCI message 220-*a*.

In some cases, the UEs 115 may be configured to transmit (or refrain from transmitting) feedback messages 225 based on whether or not the respective UEs 115 are included within the set of UEs 115 associated with the common beam update indicated in the first common DCI message 220-*a*. For example, the third UE 115-*c* may successfully receive and decode the first common DCI message 220-*a*, and may determine that the third UE 115-*c* is not included within the set of UEs 115 associated with the common beam update. In this example, as shown in FIG. 2, the third UE 115-*c* may refrain from transmitting a feedback message 225 based on identifying that the third UE 115-*c* is not included within the set of UEs 115.

In some aspects, the base station 105-*a* may determine whether the base station 105-*a* has received feedback messages 225 from each UE 115 which was expected to transmit a feedback message 225. The base station 105-*a* may determine whether the base station 105-*a* has received the expected feedback from the set of UEs 115 in order to determine whether the base station 105-*a* should retransmit the first common DCI message 220-*a*, transmit a new common DCI message 220, or both. The base station 105-*b* may determine whether the base station 105-*b* has received expected feedback messages 225 based on transmitting the control message 215, transmitting the first common DCI message 220-*a*, receiving (or failing to receive) feedback messages 225 expected UEs 115 (e.g., UEs 115 included within the set of UEs 115), or any combination thereof.

In some cases, the feedback expected by the base station 105-*a* may be based on the feedback configuration which is used or indicated to the UEs 115 via the control message 215. For example, under a NACK-only feedback configuration, the base station 105-*a* may be configured to re-transmit a common DCI message 220 to at least a UE 115 from which the base station 105-*a* received a NACK message. Additionally or alternatively, under the NACK-only feedback configuration, the base station 105-*a* may be configured to refrain from re-transmitting a common DCI message 220 based on identifying an absence of NACK messages (e.g., all feedback is discontinuous transmission (DTX)). In this regard, according to a NACK-only feedback configuration, the base station 105-*a* may be configured to identify a NACK message received from the first UE 115-*a*, and may determine that the base station 105-*b* is to re-transmit a common DCI message 220 based on the NACK message.

By way of another example, according to an ACK/NACK feedback configuration, the base station 105-*a* may be configured to re-transmit a common DCI message 220 to at least a UE 115 from which the base station 105-*a* received a NACK message, or to at least a UE 115 for which the base station 105-*a* did not receive an ACK message. Additionally or alternatively, under the ACK/NACK feedback configuration, the base station 105-*a* may be configured to refrain from re-transmitting a common DCI message 220 based on identifying the base station 105-*a* received an ACK message from each UE 115 for which feedback was expected (e.g., each UE 115 of the set of UEs 115 associated with the update to the common beam 210). In this regard, according to an ACK/NACK feedback configuration, the base station 105-*a* may be configured to identify a NACK message received from the first UE 115-*a*, and may determine that the base station 105-*b* is to re-transmit a common DCI message 220 based on the NACK message.

As noted previously herein, in some cases, the base station 105-*b* may not expect feedback messages 225 from UEs 115 (e.g., third UE 115-*c*) which are not included within the set of UEs 115 associated with the update to the common beam 210. In such cases, the absence of a feedback message 225 from the third UE 115-*c* may not trigger re-transmission of a common DCI message 220 due to the fact that the base station 105-*b* did not expect a feedback message 225 from the third UE 115-*c*.

In some aspects, the base station 105-*a* may transmit a second common DCI message 220-*b* to the first UE 115-*a*, the second UE 115-*b*, the third UE 115-*c*, or any combination thereof. In particular, the base station 105-*a* may transmit the second common DCI message 220-*b* (e.g., re-transmit a common DCI message 220) based on identified feedback messages 225 received from the UEs 115. In this regard, the base station 105-*a* may transmit the second common DCI message 220-*b* based on receiving a NACK message from a UE 115 of the set of UEs 115 associated with the common beam 210 update in a NACK-only feedback configuration. Additionally or alternatively, the base station 105-*a* may transmit the second common DCI message 220-*b* based on receiving a NACK message or identifying an absence of an ACK message from a UE 115 of the set of UEs 115 associated with the common beam 210 update in an ACK/NACK feedback configuration.

The UEs 115 may receive the second common DCI message 220-*b* based on receiving the control message 215, receiving (or failing to receive) the first common DCI message 220-*a*, transmitting (or refraining from transmitting) feedback messages 225, or any combination thereof. For example, the UEs 115 may receive the second common DCI message 220-*b* within a set of resources indicated via the control message 215, or another control message 215.

As noted previously herein with respect to the first common DCI message 220-*a*, the second common DCI message 220-*b* may indicate an update to a common beam 210. The update to the common beam 210 may apply to a set of UEs 115 (e.g., a set of UEs 115 including the first UE 115-*a* and the second UE 115-*b*). In particular, for each UE 115 of the set of UEs 115, the common beam 210 may be shared across a set of channels (e.g., downlink and uplink channel, multiple downlink channels, multiple uplink channels), a set of reference signals, or both.

The second common DCI message 220-*b* may include an indication of the set of UEs 115 which are associated with the update to the common beam 210. In this regard, the second common DCI message 220-*b* may include one or more identifiers (e.g., Rx-IDs) associated with each UE 115 of the set of UEs 115. For example, as noted previously herein, the second common DCI message 220-*b* may indicate that the first UE 115-*a* and the second UE 115-*b* are included within a set of UEs 115 associated with the common beam 210 update, and may indicate that the third UE 115-*c* is not included within the set of UEs 115 associated with the common beam 210 update.

The set of UEs 115 may be indicated via a bitmap included within the second common DCI message 220-*b*. In some aspects, the second common DCI message 220-*b* may include a second GC-DCI. The first common DCI message 220-*a* may be transmitted via L1. Additionally or alternatively, the second common DCI message 220-*b* may include a multicast transmission, a groupcast transmission, a broadcast transmission, or any combination thereof, and may include any number of formats for DCI messages (e.g., DCI 1_1, DCI 1_2).

In some aspects, the second common DCI message 220-*b* may indicate an update to a common beam 210 which is to be performed at each UE 115 of the set of UEs 115. For example, the second common DCI message 220-*b* may indicate a common TCI state for updating the common beam 210 at each UE 115 of the set of UEs 115. A TCI state may include at least one source reference signal to provide a reference for the UEs 115 to determine a QCL configuration or spatial filter for updating the common beam 210. The common beam 210 which is to be updated in accordance with the first common DCI message 220-*a* may be shared across multiple channels, multiple reference signals, or both.

For instance, the second common DCI message 220-*b* may indicate a joint uplink/downlink common TCI state configured to update a common beam 210 shared across a downlink channel and an uplink channel for each UE 115 of the set of UEs 115, shared across two reference signals for each UE 115 of the set of UEs 115, or both. Additionally or alternatively, the second common DCI message 220-*b* may indicate a separate downlink-common TCI state configured to update a common beam 210 shared across two downlink channels, shared across two reference signals, or both. Similarly, the second common DCI message 220-*b* may indicate a separate uplink-common TCI state configured to update a common beam 210 shared across two uplink channels, shared across two reference signals, or both.

In some aspects, the second common DCI message 220-*b* may include a common TCI state which is associated with the update to the common beam 210 at each UE 115 of the set of UEs 115. In such cases, each UE 115 of the set of UEs 115 may use the same common TCI state to update the common beam 210. For example, the second common DCI message 220-*b* may indicate a common TCI state which is to be used for updating the common beams 210 at the first UE 115-*a* and the second UE 115-*b*.

Additionally or alternatively, the second common DCI message 220-*b* may include multiple common TCI states, where each common TCI states is associated with the update to the common beam 210 at a subset of UEs 115 of the set of UEs 115. In such cases, different subsets of UEs 115 may be configured to use different common TCI state to update the common beam 210. The second common DCI message 220-*b* may indicate any quantity of TCI states which are to be applied for the common beam 210 update across any quantity of subsets of UEs 115.

For example, in some cases, the second common DCI message 220-*b* may include a first TCI state associated with the update to the common beam 210 at a first subset of UEs 115-*a*, and a second TCI state associated with the update to the common beam 210 at a second subset of UEs 115-*a*. In this example, the first UE 115-*a* may be included in the first subset of UEs 115, and may therefore be configured to update the common beam 210-*a* based on (e.g., in accordance with) the first TCI state. Conversely, the second UE 115-*b* may be included in the second subset of UEs 115, and may therefore be configured to update the common beam 210-*c* based on (e.g., in accordance with) the second TCI state. In some aspects, different subsets of UEs 115 may be indicated via a bitmap. For instance, continuing with the example above, a bitmap in the second common DCI message 220-*b* may indicate the first subset of UEs 115, the second subset of UEs 115, or both.

In some cases, the base station 105-*a* may be configured to re-transmit UE-specific DCI messages to UEs 115 which did not successfully receive or decode the first feedback message 225. For example, in cases where the first UE 115-*a* failed to successfully decode the first common DCI message 220-*a*, but the second UE 115-*b* successfully decoded the first common DCI message 220-*a*, the base station 105-*a* may be configured to transmit a UE-specific DCI message to the first UE 115-*a* (and not to the second UE 115-*b*).

In some aspects, the UEs 115 may again identify whether the respective UEs 115 have successfully received and decoded the second common DCI message 220-*b*. For example, the first UE 115-*a* and the second UE 115-*b* may both determine that the first UE 115-*a* and the second UE 115-*b* have successfully decoded the second common DCI message 220-*b*. In some cases, the UEs 115 may identify that the UEs 115 have successfully decoded the second common DCI message 220-*b* based on receiving the control message 215, receiving the second common DCI message 220-*b*, or both.

In some examples, the first UE 115-*a*, the second UE 115-*b*, or both, may transmit feedback messages 225 to the base station 105-*a*. The UEs 115 may transmit the feedback messages 225 based on receiving the control message 215, receiving (or failing to receive) the second common DCI message 220-*b*, determining the success for decoding the second common DCI message 220-*b*, or any combination thereof. For example, as shown in FIG. 2, the first UE 115-*a* may transmit a feedback message 225-*c* within the set of resources for transmitting feedback messages 225 indicated in the control message 215. In particular, the first UE 115-*a* may transmit (or refrain from transmitting) the feedback message 225-*c* based on (e.g., in accordance with) the one or more feedback configurations received via the control message 215.

For example, in accordance with a NACK-only feedback configuration, the second UE 115-*b* may refrain from transmitting a NACK message (e.g., feedback message 225) based on identifying that the second UE 115-*b* successfully received and decoded the second common DCI message 220-*b*. Comparatively, in accordance with an ACK/NACK feedback configuration, the first UE 115-*a* may transmit an ACK message (e.g., feedback message 225-*c*) based on identifying that the first UE 115-*a* successfully received and decoded the second common DCI message 220-*b*.

Once again, the base station 105-*a* may determine whether the base station 105-*a* has received expected feedback messages 225 responsive to the second common DCI message 220-*b*. The base station 105-*a* may determine whether the base station 105-*a* has received the expected feedback from the set of UEs 115 in order to determine whether the base station 105-*a* should retransmit the second common DCI message 220-*b*, transmit a new common DCI message 220, or both. The base station 105-*b* may determine whether the base station 105-*b* has received expected feedback messages 225 from the set of UEs 115 associated with the update to the common beam 210 based on transmitting the control message 215, transmitting the second common DCI message 220-*b*, receiving (or failing to receive) feedback messages 225 from expected UEs 115, or any combination thereof.

As noted previously herein, the feedback expected by the base station 105-*a* may be based on the feedback configuration which is used or indicated to the UEs 115 via the control message 215. For example, under the NACK-only feedback configuration, the base station 105-*a* may be configured to refrain from re-transmitting a common DCI message 220 based identifying an absence of NACK messages received from UEs 115 from which feedback is expected. Moreover, under the ACK/NACK feedback configuration, the base station 105-*a* may be configured to refrain from re-transmitting a common DCI message 220 based identifying an ACK message received from each UE 115 from which feedback is expected, identifying an absence of NACK messages received from each UE 115 from which feedback is expected, or any combination thereof.

In some aspects, the UEs 115 may determine whether the respective UE 115 is included within the set of UEs 115 associated with the common beam 210 update. In this regard, the UEs 115 may determine whether the UEs 115 are included within the set of UEs 115 indicated in the second common DCI message 220-*b*. The UEs 115 may determine whether the UEs 115 are included within the set of UEs 115 in order to determine whether or not the UEs 115 should update the common beam 210 indicated in the second common DCI message 220-*b*. In cases where the second common DCI message 220-*b* indicates the set of UEs 115 via a bitmap, the UEs 115 may determine whether or not the UEs 115 are included within the set of UEs 115 based on the bitmap. For example, the first UE 115-*a* and the second UE 115-*b* may determine that the first UE 115-*a* and the second UE 115-*b* are included within the set of UEs 115, and the third UE 115-*b* may determine that the third UE 115-*c* is not included within the set of UEs 115. In this regard, the first UE 115-*a* and the second UE 115-*b* may be configured to update the common beam 210-*a* and the common beam 210-*c*, respectively, in accordance with the second common DCI message 220-*b*.

In cases where the second common DCI message 220-*b* indicates multiple TCI states which are associated with multiple subsets of UEs 115, the UEs 115 which are included within the set of UEs 115 may be further configured to determine which subset of UEs 115 within the set of UEs 115 the UEs 115 are included within. For example, in some cases, the second common DCI message 220-*b* may include a first TCI state associated with the update to the common beam 210 at a first subset of UEs 115, and a second TCI state associated with the update to the common beam 210 at a second subset of UEs 115. In this example, the first UE 115-*a* may be configured to determine that the first UE 115-*a* is included within the first subset of UEs 115, and the second UE 115-*b* may be configured to determine that the second UE 115-*b* is included within the second subset of UEs 115. In this example, the first UE 115-*a* may be configured to perform the update to the common beam 210-*a* in accordance with the first TCI state, and the second UE 115-*b* may be configured to perform the update to the common beam 210-*c* in accordance with the second TCI state.

In some aspects, the UEs 115 included within the set of UEs 115 (e.g., first UE 115-*a*, second UE 115-*b*) may determine a validity period (e.g., application time) associated with the update to the common beam 210. The validity period may define a duration of time in which the update to the common beam 210 is to be implemented. For example, the validity period may indicate that the set of UEs 115 (or a subset of UEs 115) is to perform the update to the common beam 210 and perform communications according to the updated common beam 210 for a quantity of slots, a quantity of symbols, or both. In some aspects, the first UE 115-*a* may determine the validity period based on an indication of the validity period indicated in the second common DCI message 220-*b*. Moreover, the first UE 115-*a* may determine the validity period based on determining that the first UE 115-*a* is included within the set of UEs 115 associated with the update to the common beam 210.

In some aspects, an absence of a validity period indicated via the second common DCI message 220-*b* may serve as an implicit indication that the UEs 115 of the set of UEs 115 are to implement the update to the common beam 210 and perform communications according to the common beam 210 indefinitely, until further indications for updating the common beam 210, for a pre-defined duration, or any combination thereof.

In some cases, the second common DCI message 220-*b* may indicate a single validity period which applies to the update to the common beam 210 across each UE 115 of the set of UEs 115. Additionally or alternatively, the second common DCI message 220-*b* may indicate multiple validity periods which are associated with multiple subsets of UEs 115. For example, the second common DCI message 220-*b* may include a first validity period associated with the update to the common beam 210 at a first subset of UEs 115, and a second validity period associated with the update to the common beam 210 at a second subset of UEs 115.

In some aspects, the duration of the validity period may be based on a time at which the second common DCI message 220-*b* was transmitted or received. For example, the duration of the validity period may begin at a time at which the first UE 115-*a* received the second common DCI message 220-*b*. The duration of the validity period may also be determined relative to other points in time. For example, in some cases, the duration of the validity period may begin at the time at which the first UE 115-*a* transmitted the second feedback message 225-*c* (e.g., ACK message), at the time at which the base station 105-*a* received the second feedback message 225-*c*, or both.

Subsequently, the UEs 115 included within the set of UEs 115 associated with the update to the common beam 210 may perform at least one beam switching procedure to update the common beam 210. For example, the first UE 115-*a* may perform one or more beam switching procedures to update the first common beam 210-*a* to the second common beam 210-*b*, and the second UE 115-*b* may perform one or more beam switching procedures to update the first common beam 210-*c* to the second common beam 210-*d*. Comparatively, because the third UE 115-*c* is not included within the set of UEs 115 associated with the common beam update, the third UE 115-*c* may not perform an update to the common beam 210-*c* (and may instead use beam 210-*e*).

In some aspects, the UEs 115-*a* and 115-*b* may perform the at least one beam switching procedure based on the second common DCI message 220-*b*. Moreover, the UEs 115—may perform the at least one beam switching procedure (e.g., beamforming, retuning radio frequency components) based on determining that the respective UEs 115 are included within the set of UEs 115 associated with the common beam 210 update. In this regard, the first UE 115-*a* may update the common beam 210-*a* based on receiving the control message 215, receiving the second common DCI message 220-*b*, decoding the second common DCI message 220-*b*, transmitting the second feedback message 225-*c*, determining that the first UE 115-*a* is included within the set of UEs 115, determining the validity period of the common beam update, or any combination thereof. For example, the first UE 115-*a* may perform the at least one beam switching procedure based on (e.g., in accordance with) a common TCI state indicated in the second common DCI message 220-*b*.

In some aspects, the UEs 115 (e.g., first UE 115-*a*, second UE 115-*b*) may communicate with the base station 105-*a* using the updated common beam 210. For example, the first UE 115-*a* may perform an uplink communication 230-*a*, a downlink communication 230-*b*, or both, in accordance with the updated common beam 210-*b*. In this regard, the first UE 115-*a* may communicate with the base station 105-*a* based on performing the at least one beam switching procedure to update the first common beam 210-*a*. Moreover, the first UE 115-*a* may communicate with the base station 105-*a* using the updated common beam 210-*b* based on (e.g., for the duration of) the validity period determined. For example, the UE 115-*b* may transmit uplink transmissions or receive downlink transmissions based on (e.g., in accordance with) the updated common beam 210 for the duration of the determined validity period.

Techniques described herein may enable common beams 210 to be updated across a set of UEs 115 via a single common DCI message (e.g., GC-DCI message), the techniques described herein may enable the network to update common beams 210 across multiple UEs 115 with less control signaling. In this regard, techniques described herein may thereby reduce control signaling overhead and improve resource utilization in the wireless communications system. The ability to update a common beam 210 for a set of UEs 115 with a single common DCI message (e.g., GC-DCI message) may be particularly useful in cases where groups of UEs 115 are traveling close to one another, such as on a train or in a bus. Moreover, by indicating updates to common beams 210 across multiple UEs 115 simultaneously (e.g., via a single GC-DCI message), techniques described herein may improve the speed and efficiency with which common beams 210 may be updated at UEs 115 within a wireless communications system, thereby improving the efficiency of wireless communications within the wireless communications system.

Figure 3:
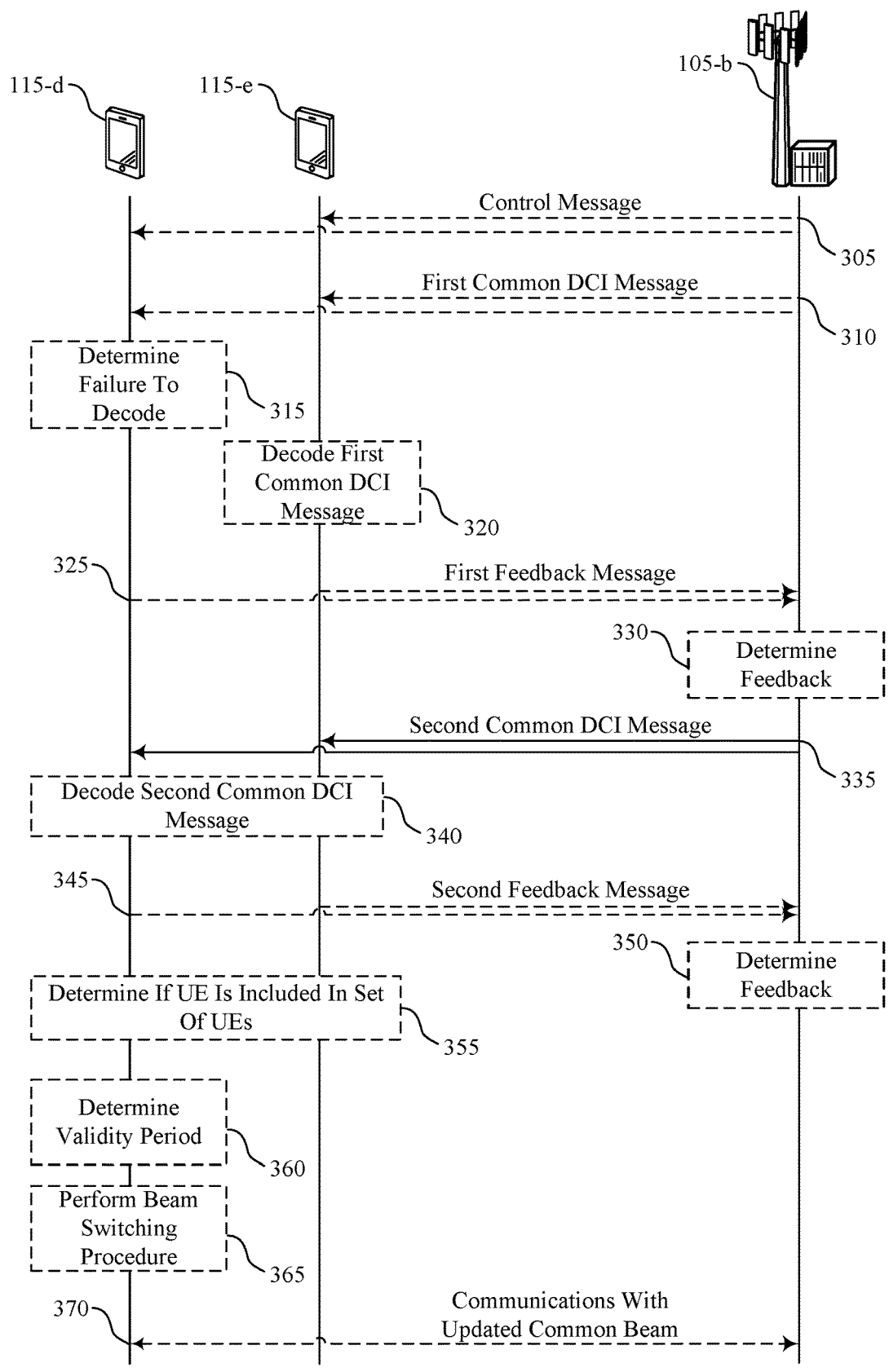
FIG. 3 illustrates an example of a process flow that supports techniques for common beam updates indicated by common DCI in accordance with aspects of the present disclosure.

FIG. 3 illustrates an example of a process flow 300 that supports techniques for common beam updates indicated by common DCI in accordance with aspects of the present disclosure. In some examples, process flow 300 may implement, or be implemented by, aspects of wireless communications system 100, wireless communications system 200, or both. For example, the process flow 300 may illustrate a UE 115-*d* receiving a common DCI message, and updating a common beam at the UE 115-*d* in accordance with the common DCI message, as described with reference to FIGS. 1 and 2, among other aspects.

In some aspects, the process flow 300 may include a first UE 115-*d*, a second UE 115-*b*, and a base station 105-*b*, which may include examples of UEs 115 and base stations 105 as described with reference to FIGS. 1 and 2. For example, the first UE 115-*d* illustrated in FIG. 3 may include an example of the first UE 115-*a* illustrated in FIG. 2. Similarly, the base station 105-*b* illustrated in FIG. 3 may be an example of the base station 105-*a* illustrated in FIG. 2.

In some examples, the operations illustrated in process flow 300 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 305, the base station 105-*b* may transmit a control message to the UE 115-*d*, the UE 115-*e*, or both. The control message may include, but is not limited to, a DCI message (e.g., common DCI message), a MAC-CE message, an RRC message, and the like. In some aspects, the control message may indicate a set of resources for receiving DCI messages (e.g., common DCI messages), a set of resources for transmitting feedback messages (e.g., ACK/NACK) responsive to common DCI messages, or both. Additionally or alternatively, the control message may indicate one or more feedback configurations for transmitting feedback messages responsive to common DCI messages. In this regard, the control message may configure the UE 115-*d* or the UE 115-*e* with a set of rules associated with transmitting feedback messages.

For example, according to a first feedback configuration, the UEs 115-*d* and 115-*e* may be configured to transmit NACK messages in the event that the respective UEs 115 fail to decode a common DCI message (e.g., NACK-only feedback configuration). According to another feedback configuration, the UEs 115-*d* and 115-*e* may be configured to transmit both ACK and NACK messages depending on whether a common DCI message is successfully decoded (e.g., ACK/NACK feedback configuration).

At 310, the base station 105-*b* may transmit a first common DCI message to the UE 115-*d*, the UE 115-*e*, or both. The UEs 115 may receive the first common DCI message based on receiving the control message at 305. For example, the UEs 115 may receive the first common DCI message within the set of resources indicated via the control message at 305. In some aspects, the first common DCI message may indicate an update to a common beam. The update to the common beam may apply to a set of UEs 115 (e.g., a set of UEs 115 including the first UE 115-*d*, the second UE 115-*e*, or both). In particular, for each UE 115 of the set of UEs 115, the common beam may be shared across a set of channels (e.g., downlink and uplink channel, multiple downlink channels, multiple uplink channels), a set of reference signals, or both.

The first common DCI message may include an indication of the set of UEs 115 which are associated with the update to the common beam. In this regard, the first common DCI message may include one or more identifiers (e.g., Rx-IDs) associated with each UE 115 of the set of UEs 115. The set of UEs 115 may be indicated via a bitmap included within the first common DCI message. In some aspects, the first common DCI message may include a first GC-DCI. The first common DCI message may be transmitted via L1. Additionally or alternatively, the first common DCI message may include a multicast transmission, a groupcast transmission, a broadcast transmission, or any combination thereof, transmission, and may include any number of formats for DCI messages (e.g., DCI 1_1, DCI 1_2).

In some aspects, the first common DCI message may indicate an update to a common beam which is to be performed at each UE 115 of the set of UEs 115. For example, the first common DCI message may indicate a common TCI state for updating the common beam at each UE 115 of the set of UEs 115. A TCI state may include at least one source reference signal to provide a reference for the UEs 115 to determine a QCL configuration or spatial filter for updating the common beam. The common beam which is to be updated in accordance with the first common DCI message may be shared across multiple channels, multiple reference signals, or both.

For instance, the first common DCI message may indicate a joint uplink/downlink common TCI state configured to update a common beam shared across a downlink channel and an uplink channel for each UE 115 of the set of UEs 115, shared across two reference signals for each UE 115 of the set of UEs 115, or both. Additionally or alternatively, the first common DCI message may indicate a separate downlink-common TCI state configured to update a common beam shared across two downlink channels, shared across two reference signals, or both. Similarly, the first common DCI message may indicate a separate uplink-common TCI state configured to update a common beam shared across two uplink channels, shared across two reference signals, or both.

At 315, the first UE 115-*d* may identify a failure of the first UE 115-*d* to receive or decode the first common DCI message. In some cases, the first UE 115-*d* may identify that the first UE 115-*d* did not successfully decode the first common DCI message based on receiving the control message at 305, receiving (or failing to receive) the first common DCI message at 310, or both.

At 320, the second UE 115-*e* may identify that the second UE 115-*e* successfully received and decoded the first common DCI message. In some cases, the second UE 115-*e* may identify that the second UE 115-*e* successfully decoded the first common DCI message based on receiving the control message at 305, receiving the first common DCI message at 310, or both.

At 325, the first UE 115-*d*, the second UE 115-*e*, or both, may transmit a first feedback message to the base station. The UEs 115 may transmit the first feedback messages based on receiving the control message at 305, receiving (or failing to receive) the first common DCI message at 310, determining the failure or success for decoding the first common DCI message at 315 and 320, or any combination thereof. For example, the UEs 115 may transmit the feedback messages within the set of resources for transmitting feedback messages indicated in the control message received at 305. In particular, the UEs 115 may transmit (or refrain from transmitting) the first feedback message at 325 based on (e.g., in accordance with) the one or more feedback configurations received via the control message at 305.

For example, the first UE 115-*d* may transmit the first feedback message at 325 (e.g., NACK message) based on identifying that the first UE 115-*d* failed to successfully receive or decode the first common DCI message at 315. The first UE 115-*d* may be configured to transmit the NACK message at 325 in accordance with a NACK-only feedback configuration, an ACK/NACK feedback configuration, or both. In some cases, a NACK message may serve as a request for the base station 105-*b* to re-transmit the first common DCI message, transmit a new common DCI message, or both.

By way of another example, the second UE 115-*e* may transmit the first feedback message at 325 (e.g., ACK message) based on identifying that the second UE 115-*e* successfully received and decoded the first common DCI message at 320. The second UE 115-*e* may be configured to transmit the ACK message at 325 in accordance with an ACK/NACK feedback configuration. Comparatively, in cases where the second UE 115-*e* is configured with a NACK-only feedback configuration, the second UE 115-*e* may refrain from transmitting an ACK message at 325. In some cases, the absence of a NACK message received from the second UE 115-*e* may indicate to the base station 105-*b* that the second UE 115-*e* successfully received and decoded the first common DCI message.

At 330, the base station 105-*b* may determine whether the base station 105-*b* has received feedback messages from each UE 115 of the set of UEs 115 associated with the common beam update which was expected to transmit a feedback message. The base station 105-*b* may determine whether the base station 105-*b* has received the expected feedback from the set of UEs 115 in order to determine whether the base station 105-*b* should retransmit the first common DCI message, transmit a new common DCI message, or both. The base station 105-*b* may determine whether the base station 105-*b* has received expected feedback messages from the set of UEs 115 associated with the update to the common beam based on transmitting the control message at 305, transmitting the first common DCI message at 310, receiving (or failing to receive) a first feedback message from the first UE 115-*d* or the second UE 115-*e* at 325, or any combination thereof.

In some cases, the feedback expected by the base station 105-*b* may be based on the feedback configuration which is used or indicated to the UEs 115 via the control message at 305. For example, under a NACK-only feedback configuration, the base station 105-*b* may be configured to re-transmit a common DCI message to at least a UE 115 from which the base station 105-*b* received a NACK message. Additionally or alternatively, under the NACK-only feedback configuration, the base station 105-*b* may be configured to refrain from re-transmitting a common DCI message based on identifying an absence of NACK messages (e.g., all feedback is DTX). In this regard, according to a NACK-only feedback configuration, the base station 105-*b* may be configured to identify a NACK message received from the first UE 115-*d*, and may determine that the base station 105-*b* is to re-transmit a common DCI message based on the NACK message.

By way of another example, according to an ACK/NACK feedback configuration, the base station 105-*b* may be configured to re-transmit a common DCI message to at least a UE 115 from which the base station 105-*b* received a NACK message, or to at least a UE 115 for which the base station 105-*b* did not receive an ACK message. Additionally or alternatively, under the ACK/NACK feedback configuration, the base station 105-*b* may be configured to refrain from re-transmitting a common DCI message based on identifying the base station 105-*b* received an ACK message from each UE 115 of the set of UEs 115 associated with the update to the common beam. In this regard, according to an ACK/NACK feedback configuration, the base station 105-*b* may be configured to identify a NACK message received from the first UE 115-*d*, and may determine that the base station 105-*b* is to re-transmit a common DCI message based on the NACK message.

At 335, the base station 105-*b* may transmit a second common DCI message to the first UE 115-*d*, the second UE 115-*e*, or both. In particular, the base station 105-*b* may transmit the second common DCI message (e.g., re-transmit a common DCI message) based on the feedback determined at 330. In this regard, the base station 105-*b* may transmit the second common DCI message based on receiving a NACK message from a UE 115 of the set of UEs 115 associated with the common beam update in a NACK-only feedback configuration. Additionally or alternatively, the base station 105-*b* may transmit the second common DCI message based on receiving a NACK message or identifying an absence of an ACK message from a UE 115 of the set of UEs 115 associated with the common beam update in an ACK/NACK feedback configuration.

The UEs 115 may receive the second common DCI message based on receiving the control message at 305, receiving (or failing to receive) the first common DCI message at 310, transmitting (or refraining from transmitting) the first feedback message at 325, or any combination thereof. For example, the UEs 115 may receive the second common DCI message within a set of resources indicated via the control message at 305, or another control message.

As noted previously herein with respect to the first common DCI message, the second common DCI message may indicate an update to a common beam. The update to the common beam may apply to a set of UEs 115 (e.g., a set of UEs 115 including the first UE 115-*d*, the second UE 115-*e*, or both). In particular, for each UE 115 of the set of UEs 115, the common beam may be shared across a set of channels (e.g., downlink and uplink channel, multiple downlink channels, multiple uplink channels), a set of reference signals, or both.

The second common DCI message may include an indication of the set of UEs 115 which are associated with the update to the common beam. In this regard, the second common DCI message may include one or more identifiers (e.g., Rx-IDs) associated with each UE 115 of the set of UEs 115. The set of UEs 115 may be indicated via a bitmap included within the second common DCI message. In some aspects, the second common DCI message may include a second GC-DCI. The first common DCI message may be transmitted via L1. Additionally or alternatively, the second common DCI message may include a multicast transmission, a groupcast transmission, a broadcast transmission, or any combination thereof, and may include any number of formats for DCI messages (e.g., DCI 1_1, DCI 1_2).

In some aspects, the second common DCI message may indicate an update to a common beam which is to be performed at each UE 115 of the set of UEs 115. For example, the second common DCI message may indicate a common TCI state for updating the common beam at each UE 115 of the set of UEs 115. A TCI state may include at least one source reference signal to provide a reference for the UEs 115 to determine a QCL configuration or spatial filter for updating the common beam. The common beam which is to be updated in accordance with the first common DCI message may be shared across multiple channels, multiple reference signals, or both.

For instance, the second common DCI message may indicate a joint uplink/downlink common TCI state configured to update a common beam shared across a downlink channel and an uplink channel for each UE 115 of the set of UEs 115, shared across two reference signals for each UE 115 of the set of UEs 115, or both. Additionally or alternatively, the second common DCI message may indicate a separate downlink-common TCI state configured to update a common beam shared across two downlink channels, shared across two reference signals, or both. Similarly, the second common DCI message may indicate a separate uplink-common TCI state configured to update a common beam shared across two uplink channels, shared across two reference signals, or both.

In some aspects, the second common DCI message may include a common TCI state which is associated with the update to the common beam at each UE 115 of the set of UEs 115. In such cases, each UE 115 of the set of UEs 115 may use the same common TCI state to update the common beam. Additionally or alternatively, the second common DCI message may include multiple common TCI states, where each common TCI states is associated with the update to the common beam at a subset of UEs 115 of the set of UEs 115. In such cases, different subsets of UEs 115 may be configured to use different common TCI state to update the common beam. The second common DCI message may indicate any quantity of TCI states which are to be applied for the common beam update across any quantity of subsets of UEs 115.

For example, in some cases, the second common DCI message may include a first TCI state associated with the update to the common beam at a first subset of UEs 115-a, and a second TCI state associated with the update to the common beam at a second subset of UEs 115-a. In this example, the first subset of UEs 115 may be configured to update the common beam based on (e.g., in accordance with) the first TCI state, and the second subset of UEs 115 may be configured to update the common beam based on (e.g., in accordance with) the second TCI state. In some aspects, different subsets of UEs 115 may be indicated via a bitmap. For instance, continuing with the example above, a bitmap in the second common DCI message may indicate the first subset of UEs 115, the second subset of UEs 115, or both.

In some cases, the base station 105-b may be configured to re-transmit UE-specific DCI messages to UEs 115 which did not successfully receive or decode the first feedback message 325. For example, in cases where the first UE 115-d failed to successfully decode the first common DCI message, but the second UE 115-e successfully decoded the first common DCI message, the base station 105-b may be configured to transmit a UE-specific DCI message to the first UE 115-d (and not to the second UE 115-e). Accordingly, while process flow 300 illustrates the transmission of a second common DCI message at 335, this may not be the case for all implementations.

At 340, the first UE 115-d and the second UE 115-e may identify that the respective UEs 115 have successfully received and decoded the second common DCI message. In some cases, the UEs 115 may identify that the UEs 115 have successfully decoded the second common DCI message based on receiving the control message at 305, receiving the second common DCI message at 335, or both.

At 345, the first UE 115-d, the second UE 115-e, or both, may transmit a second feedback message to the base station 105-b. The UEs 115 may transmit the second feedback messages based on receiving the control message at 305, receiving (or failing to receive) the second common DCI message at 335, determining the success for decoding the second common DCI message at 340, or any combination thereof. For example, the UEs 115 may transmit the feedback messages within the set of resources for transmitting feedback messages indicated in the control message received at 305. In particular, the UEs 115 may transmit (or refrain from transmitting) the second feedback message at 345 based on (e.g., in accordance with) the one or more feedback configurations received via the control message at 305.

For example, in accordance with a NACK-only feedback configuration, the UEs 115 may refrain from transmitting a NACK message at 345 based on identifying that the UEs 115 have successfully received the second common DCI message at 340. Comparatively, in accordance with an ACK/NACK feedback configuration, the UEs 115 may transmit ACK messages at 345 based on identifying that the UEs 115 have successfully received the second common DCI message at 340.

At 350, the base station 105-b may determine whether the base station 105-b has received feedback messages from each UE 115 of the set of UEs 115 associated with the common beam update which was expected to transmit a feedback message. The base station 105-b may determine whether the base station 105-b has received the expected feedback from the set of UEs 115 in order to determine whether the base station 105-b should retransmit the second common DCI message, transmit a new common DCI message, or both. The base station 105-b may determine whether the base station 105-b has received expected feedback messages from the set of UEs 115 associated with the update to the common beam based on transmitting the control message at 305, transmitting the second common DCI message at 335, receiving (or failing to receive) a second feedback message from the first UE 115-d or the second UE 115-e at 350, or any combination thereof.

As noted previously herein, the feedback expected by the base station 105-b may be based on the feedback configuration which is used or indicated to the UEs 115 via the control message at 305. For example, under the NACK-only feedback configuration, the base station 105-b may be configured to refrain from re-transmitting a common DCI message based identifying an absence of NACK messages received from the first UE 115-d and second UE 115-e at 345. Moreover, under the ACK/NACK feedback configuration, the base station 105-b may be configured to refrain from re-transmitting a common DCI message based identifying an ACK message received from each of the first UE 115-d and second UE 115-e at 345, identifying an absence of NACK messages received from the first UE 115-d or the second UE 115-e, or any combination thereof.

At 355, the first UE 115-d, the second UE 115-e, or both, may determine whether the respective UE 115 is included within the set of UEs 115 associated with the common beam update. In this regard, the UEs 115 may determine whether the UEs 115 are included within the set of UEs 115 indicated in the second common DCI message. The UEs 115 may determine whether the UEs 115 are included within the set of UEs 115 in order to determine whether or not the UEs 115 should update the common beam indicated in the second common DCI message. In cases where the second common DCI message indicates the set of UEs 115 via a bitmap, the UEs 115 may determine whether or not the UEs 115 are included within the set of UEs 115 based on the bitmap. For example, the first UE 115-d may determine that the first UE 115-d is included within the set of UEs 115, and the second UE 115-e may determine that the second UE 115-e is not included within the set of UEs 115. In this regard, the first UE 115-d may be configured that the first UE 115-d is to update the common beam in accordance with the second common DCI message.

While the process flow 300 shows and describes both the first UE 115-*d* and the second UE 115-*e* transmitting feedback messages responsive to the first and second common DCI messages, the UEs 115 may not transmit feedback messages in all implementations. For example, in some cases, UEs 115 which are included within the set of UEs 115 associated with the common beam update may be expected to transmit feedback messages. In this regard, in cases where the second UE 115-*e* is not included within the set of UEs 115, the second UE 115-*e* may not be expected to transmit the second feedback message at 345. As such, in some implementations, the UEs 115 may be configured to decode the common DCI messages and determine whether the UEs 115 are included within the set of UEs 115 indicated in the common DCI messages prior to transmitting feedback messages.

In cases where the second common DCI message indicates multiple TCI states which are associated with multiple subsets of UEs 115, the UEs 115 which are included within the set of UEs 115 may be further configured to determine which subset of UEs 115 within the set of UEs 115 the UEs 115 are included within. For example, in some cases, the second common DCI message may include a first TCI state associated with the update to the common beam at a first subset of UEs 115, and a second TCI state associated with the update to the common beam at a second subset of UEs 115. In this example, the first UE 115-*d* may be configured to determine whether the first UE 115-*d* is included within the first subset of UEs 115 or the second subset of UEs 115 in order to determine which TCI state the first UE 115-*d* is to use to perform the common beam update. For instance, in cases where the first UE 115-*d* determines that the first UE 115-*d* is included within the first subset of UEs 115, the first UE 115-*d* may be configured to perform the common beam update in accordance with the first TCI state.

At 360, the first UE 115-*d* may determine a validity period (e.g., application time) associated with the update to the common beam. The validity period may define a duration of time in which the update to the common beam is to be implemented. For example, the validity period may indicate that the set of UEs 115 (or a subset of UEs 115) is to perform the update to the common beam and perform communications according to the updated common beam for a quantity of slots, a quantity of symbols, or both. In some aspects, the first UE 115-*d* may determine the validity period based on an indication of the validity period indicated in the second common DCI message received at 335. Moreover, the first UE 115-*d* may determine the validity period based on determining that the first UE 115-*d* is included within the set of UEs 115 associated with the update to the common beam.

In some aspects, an absence of a validity period indicated via the second common DCI message may serve as an implicit indication that the UEs 115 of the set of UEs 115 are to implement the update to the common beam and perform communications according to the common beam indefinitely, until further indications for updating the common beam, for a pre-defined duration, or any combination thereof.

In some cases, the second common DCI message may indicate a single validity period which applies to the update to the common beam across each UE 115 of the set of UEs 115. Additionally or alternatively, the second common DCI message may indicate multiple validity periods which are associated with multiple subsets of UEs 115. For example, the second common DCI message may include a first validity period associated with the update to the common beam at a first subset of UEs 115, and a second validity period associated with the update to the common beam at a second subset of UEs 115.

In some aspects, the duration of the validity period may be based on a time at which the second common DCI message was transmitted or received. For example, the duration of the validity period may begin at a time at which the first UE 115-*d* received the second common DCI message. The duration of the validity period may also be determined relative to other points in time. For example, in some cases, the duration of the validity period may begin at the time at which the first UE 115-*d* transmitted the second feedback message (e.g., ACK message), at the time at which the base station 105-*b* received the second feedback message, or both.

At 365, the first UE 115-*d* may perform at least one beam switching procedure to update the common beam. In some aspects, the first UE 115-*d* may perform the at least one beam switching procedure based on the second common DCI message. Moreover, the first UE 115-*d* may perform the at least one beam switching procedure (e.g., beamforming, retuning radio frequency components) based on determining that the first UE 115-*d* is included within the set of UEs 115 associated with the common beam update. In this regard, the first UE 115-*d* may update the common beam at 365 based on receiving the control message at 305, receiving the second common DCI message at 335, decoding the second common DCI message at 340, transmitting the second feedback message at 345, determining that the first UE 115-*d* is included within the set of UEs 115 at 355, determining the validity period at 360, or any combination thereof. For example, the first UE 115-*d* may perform the at least one beam switching procedure based on (e.g., in accordance with) a common TCI state indicated in the DCI message.

At 370, the first UE 115-*d* may communicate with the base station 105-*b* using the updated common beam. In this regard, the first UE 115-*d* may communicate with the base station 105-*b* based on performing the at least one beam switching procedure at 365. Moreover, the UE 115-*d* may communicate with the base station 105-*b* using the updated common beam based on (e.g., for the duration of) the validity period determined at 360. For example, the UE 115-*b* may transmit uplink transmissions or receive downlink transmissions based on (e.g., in accordance with) the updated common beam for the duration of the determined validity period.

Techniques described herein may enable common beams to be updated across a set of UEs 115 via a single common DCI message (e.g., GC-DCI message), the techniques described herein may enable the network to update common beams across multiple UEs 115 with less control signaling. In this regard, techniques described herein may thereby reduce control signaling overhead and improve resource utilization in the wireless communications system. The ability to update a common beam for a set of UEs 115 with a single common DCI message (e.g., GC-DCI message) may be particularly useful in cases where groups of UEs 115 are traveling close to one another, such as on a train or in a bus. Moreover, by indicating updates to common beams across multiple UEs 115 simultaneously (e.g., via a single GC-DCI message), techniques described herein may improve the speed and efficiency with which common beams may be updated at UEs 115 within a wireless communications system, thereby improving the efficiency of wireless communications within the wireless communications system.

Figure 4:
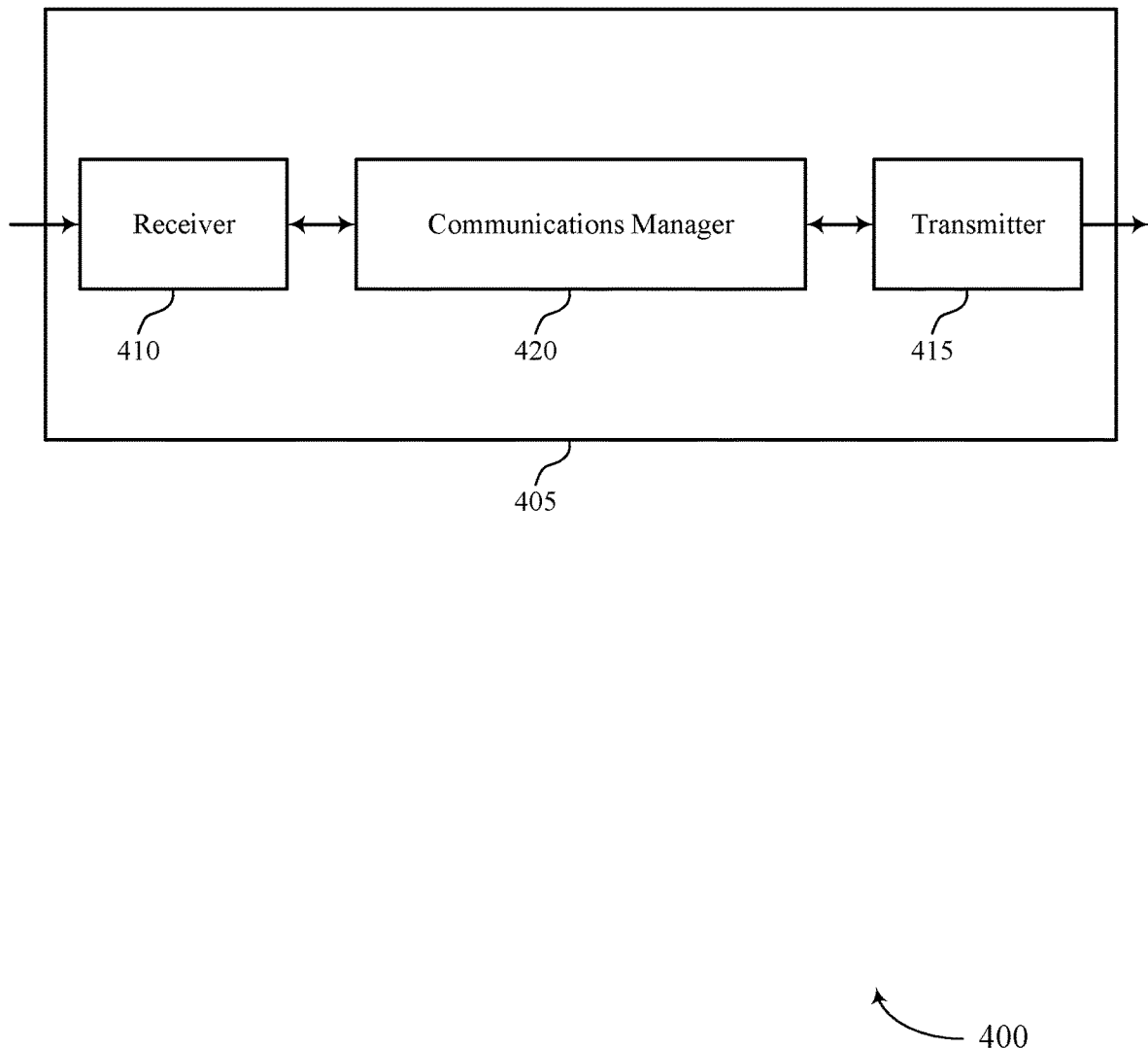
FIGS. 4 and 5 show block diagrams of devices that support techniques for common beam updates indicated by common DCI in accordance with aspects of the present disclosure.

FIG. 4 shows a block diagram 400 of a device 405 that supports techniques for common beam updates indicated by common DCI in accordance with aspects of the present disclosure. The device 405 may be an example of aspects of a UE 115 as described herein. The device 405 may include a receiver 410, a transmitter 415, and a communications manager 420. The device 405 may also include a processor. Each of these components may be in communication with one another (e.g., via one or more buses).

The receiver 410 may provide a means for receiving information such as packets, user data, control information, or any combination thereof associated with various information channels (e.g., control channels, data channels, information channels related to techniques for common beam updates indicated by common DCI). Information may be passed on to other components of the device 405. The receiver 410 may utilize a single antenna or a set of multiple antennas.

The transmitter 415 may provide a means for transmitting signals generated by other components of the device 405. For example, the transmitter 415 may transmit information such as packets, user data, control information, or any combination thereof associated with various information channels (e.g., control channels, data channels, information channels related to techniques for common beam updates indicated by common DCI). In some examples, the transmitter 415 may be co-located with a receiver 410 in a transceiver module. The transmitter 415 may utilize a single antenna or a set of multiple antennas.

The communications manager 420, the receiver 410, the transmitter 415, or various combinations thereof or various components thereof may be examples of means for performing various aspects of techniques for common beam updates indicated by common DCI as described herein. For example, the communications manager 420, the receiver 410, the transmitter 415, or various combinations or components thereof may support a method for performing one or more of the functions described herein.

In some examples, the communications manager 420, the receiver 410, the transmitter 415, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 420, the receiver 410, the transmitter 415, or various combinations or components thereof may be implemented in code (e.g., as communications management software or firmware) executed by a processor. If implemented in code executed by a processor, the functions of the communications manager 420, the receiver 410, the transmitter 415, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 420 may be configured to perform various operations (e.g., receiving, monitoring, transmitting) using or otherwise in cooperation with the receiver 410, the transmitter 415, or both. For example, the communications manager 420 may receive information from the receiver 410, send information to the transmitter 415, or be integrated in combination with the receiver 410, the transmitter 415, or both to receive information, transmit information, or perform various other operations as described herein.

The communications manager 420 may support wireless communication at a UE in accordance with examples as disclosed herein. For example, the communications manager 420 may be configured as or otherwise support a means for receiving, from a base station, a common DCI message indicating an update to a common beam which applies to a set of multiple UEs, where for each UE of the set of multiple UEs the common beam is shared across a set of multiple channels, a set of multiple reference signals, or both. The communications manager 420 may be configured as or otherwise support a means for receiving, via the common DCI message, an indication of the set of multiple UEs associated with the update to the common beam. The communications manager 420 may be configured as or otherwise support a means for performing at least one beam switching procedure to update the common beam at the UE based on receiving the common DCI message and the UE being included within the set of multiple UEs.

By including or configuring the communications manager 420 in accordance with examples as described herein, the device 405 (e.g., a processor controlling or otherwise coupled with the receiver 410, the transmitter 415, the communications manager 420, or a combination thereof) may support techniques for updating common beams across a set of UEs 115 via a single common DCI message (e.g., GC-DCI message). In this regard, techniques described herein may thereby reduce control signaling overhead, reduce latency of common beam updates, and improve resource utilization in the wireless communications system.

Figure 5:
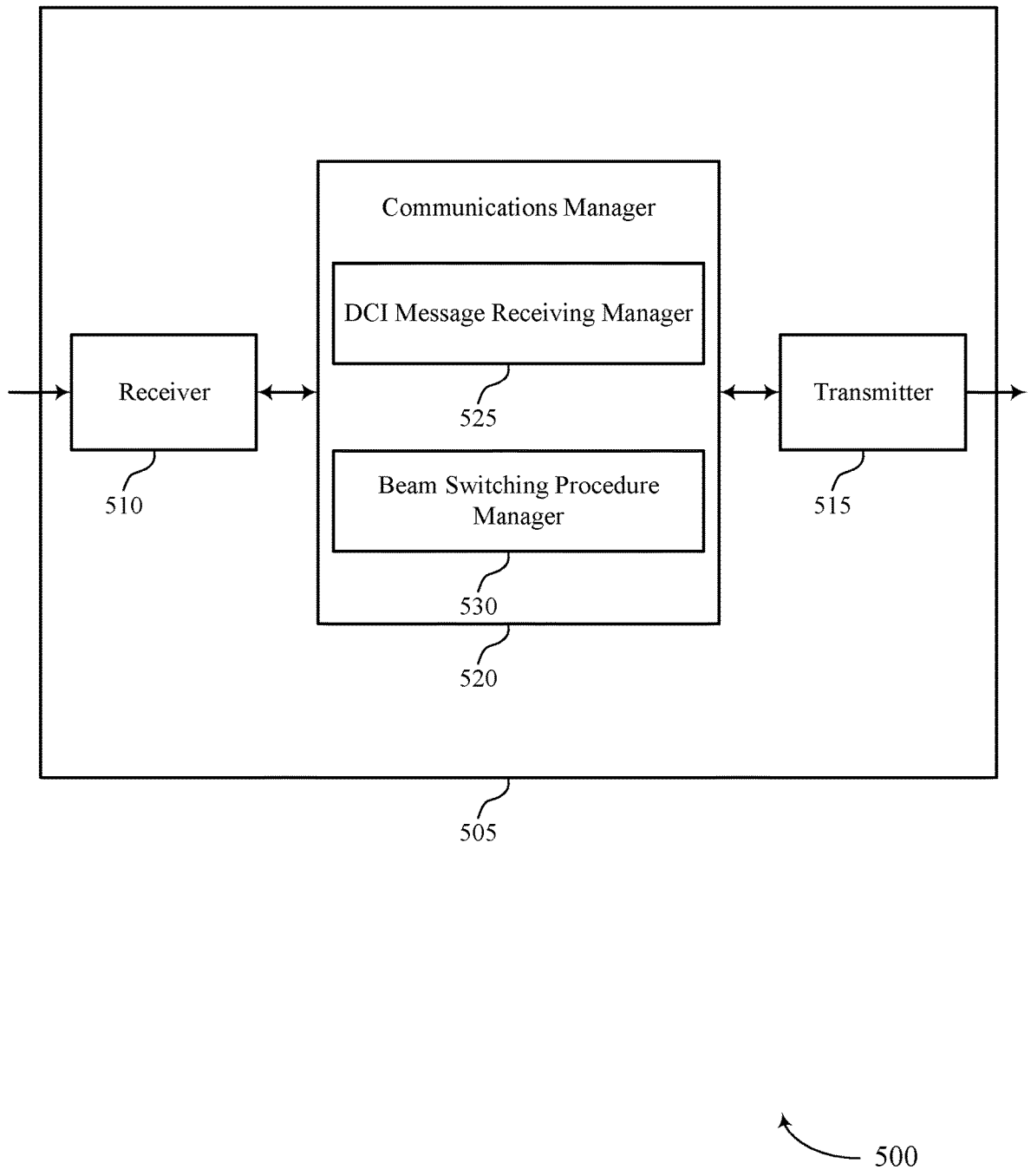

FIG. 5 shows a block diagram 500 of a device 505 that supports techniques for common beam updates indicated by common DCI in accordance with aspects of the present disclosure. The device 505 may be an example of aspects of a device 405 or a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to techniques for common beam updates indicated by common DCI). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to techniques for common beam updates indicated by common DCI). In some examples, the transmitter 515 may be co-located with a receiver 510 in a transceiver module. The transmitter 515 may utilize a single antenna or a set of multiple antennas.

The device 505, or various components thereof, may be an example of means for performing various aspects of techniques for common beam updates indicated by common DCI as described herein. For example, the communications manager 520 may include a DCI message receiving manager 525 a beam switching procedure manager 530, or any combination thereof. The communications manager 520 may be an example of aspects of a communications manager 420 as described herein. In some examples, the communications manager 520, or various components thereof, may be configured to perform various operations (e.g., receiving, monitoring, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to receive information, transmit information, or perform various other operations as described herein.

The communications manager 520 may support wireless communication at a UE in accordance with examples as disclosed herein. The DCI message receiving manager 525 may be configured as or otherwise support a means for receiving, from a base station, a common DCI message indicating an update to a common beam which applies to a set of multiple UEs, where for each UE of the set of multiple UEs the common beam is shared across a set of multiple channels, a set of multiple reference signals, or both. The DCI message receiving manager 525 may be configured as or otherwise support a means for receiving, via the common DCI message, an indication of the set of multiple UEs associated with the update to the common beam. The beam switching procedure manager 530 may be configured as or otherwise support a means for performing at least one beam switching procedure to update the common beam at the UE based on receiving the common DCI message and the UE being included within the set of multiple UEs.

Figure 6:
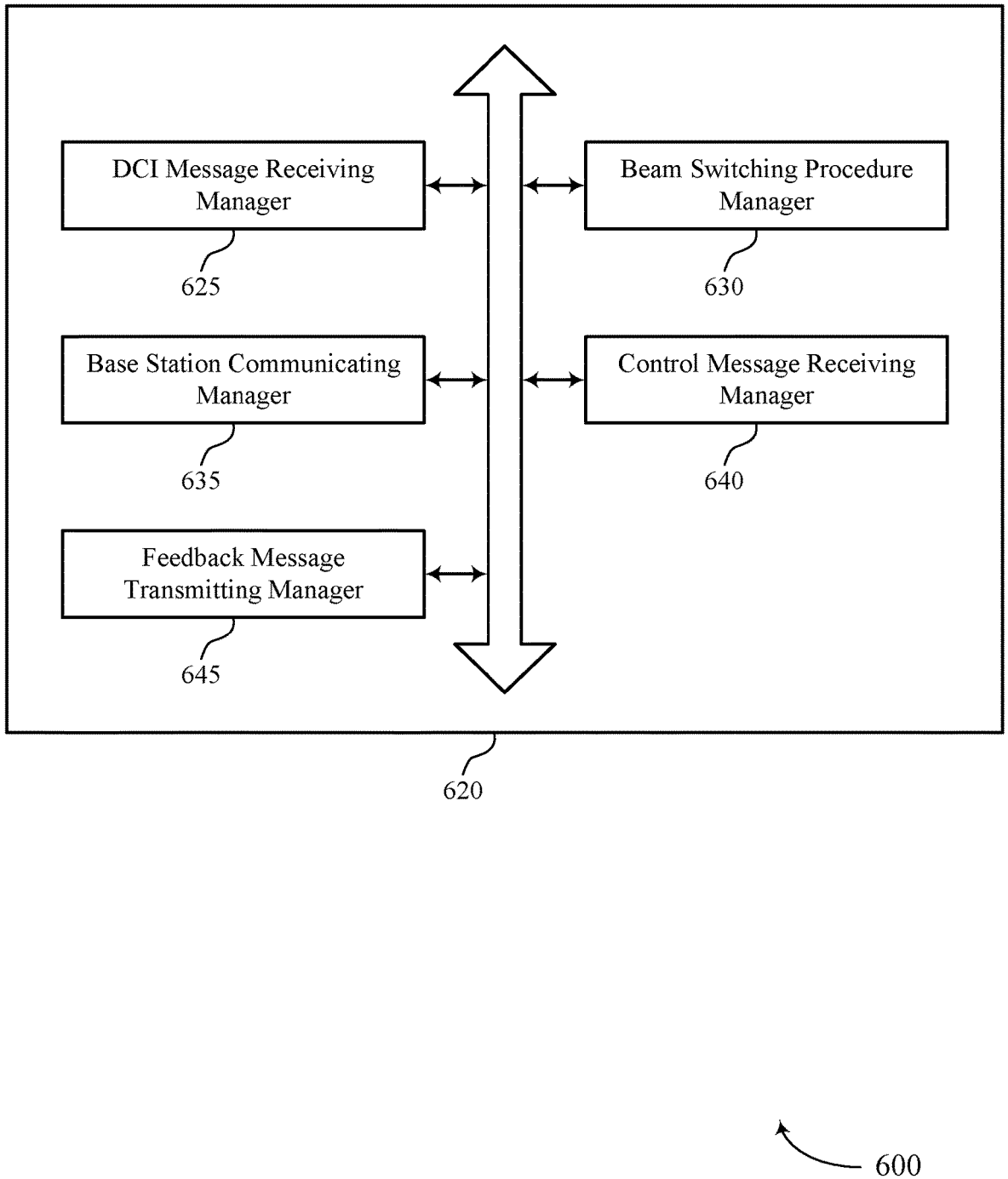
FIG. 6 shows a block diagram of a communications manager that supports techniques for common beam updates indicated by common DCI in accordance with aspects of the present disclosure.

FIG. 6 shows a block diagram 600 of a communications manager 620 that supports techniques for common beam updates indicated by common DCI in accordance with aspects of the present disclosure. The communications manager 620 may be an example of aspects of a communications manager 420, a communications manager 520, or both, as described herein. The communications manager 620, or various components thereof, may be an example of means for performing various aspects of techniques for common beam updates indicated by common DCI as described herein. For example, the communications manager 620 may include a DCI message receiving manager 625, a beam switching procedure manager 630, a base station communicating manager 635, a control message receiving manager 640, a feedback message transmitting manager 645, or any combination thereof. Each of these components may communicate, directly or indirectly, with one another (e.g., via one or more buses).

The communications manager 620 may support wireless communication at a UE in accordance with examples as disclosed herein. The DCI message receiving manager 625 may be configured as or otherwise support a means for receiving, from a base station, a common DCI message indicating an update to a common beam which applies to a set of multiple UEs, where for each UE of the set of multiple UEs the common beam is shared across a set of multiple channels, a set of multiple reference signals, or both. In some examples, the DCI message receiving manager 625 may be configured as or otherwise support a means for receiving, via the common DCI message, an indication of the set of multiple UEs associated with the update to the common beam. The beam switching procedure manager 630 may be configured as or otherwise support a means for performing at least one beam switching procedure to update the common beam at the UE based on receiving the common DCI message and the UE being included within the set of multiple UEs.

In some examples, the DCI message receiving manager 625 may be configured as or otherwise support a means for receiving, via the common DCI message, a TCI state associated with the update to the common beam at each UE of the set of multiple UEs, where performance of the at least one beam switching procedure is based on the TCI state.

In some examples, the DCI message receiving manager 625 may be configured as or otherwise support a means for receiving, via the common DCI message, a first TCI state associated with the update to the common beam at a first subset of UEs of the set of multiple UEs. In some examples, the DCI message receiving manager 625 may be configured as or otherwise support a means for receiving, via the common DCI message, a second TCI state associated with the update to the common beam at a second subset of UEs of the set of multiple UEs. In some examples, the beam switching procedure manager 630 may be configured as or otherwise support a means for identifying that the UE is included within the first subset of UEs or the second subset of UEs, where performance of the at least one beam switching procedure is based on the first TCI state or the second TCI state which is associated with the first subset of UEs or the second subset of UEs within which the UE is included.

In some examples, the DCI message receiving manager 625 may be configured as or otherwise support a means for receiving, via the common DCI message, a bitmap indicating the first subset of UEs, the second subset of UEs, or both, where the identifying is based on the bitmap.

In some examples, the DCI message receiving manager 625 may be configured as or otherwise support a means for receiving, via the common DCI message, a validity period associated with the update to the common beam and at least a subset of the set of multiple UEs. In some examples, the base station communicating manager 635 may be configured as or otherwise support a means for communicating with the base station using the common beam for at least a duration of the validity period and based on the UE being included within the at least the subset of the set of multiple UEs.

In some examples, the feedback message transmitting manager 645 may be configured as or otherwise support a means for transmitting a feedback message to the base station in response to receiving the common DCI message, where the duration of the validity period is based on transmitting the feedback message. In some examples, the duration of the validity period is based on receiving the common DCI message.

In some examples, the control message receiving manager 640 may be configured as or otherwise support a means for receiving, from the base station, a control message indicating a set of resources for transmitting a feedback message responsive to the common DCI message. In some examples, the feedback message transmitting manager 645 may be configured as or otherwise support a means for transmitting, to the base station, the feedback message within the set of resources and in response to the common DCI message. In some examples, the control message includes the common DCI message, a MAC-CE message, a RRC message, or any combination thereof.

In some examples, the DCI message receiving manager 625 may be configured as or otherwise support a means for receiving an additional common DCI message indicating the update to the common beam. In some examples, the feedback message transmitting manager 645 may be configured as or otherwise support a means for transmitting, to the base station, a feedback message based on identifying that the UE failed to successfully decode the additional common DCI message, where the common DCI message is received in response to the feedback message.

In some examples, the feedback message transmitting manager 645 may be configured as or otherwise support a means for transmitting a feedback message to the base station based on identifying that the UE successfully decoded the common DCI message.

In some examples, for each UE of the set of multiple UEs the common beam is shared across a downlink channel and an uplink channel. In some examples, for each UE of the set of multiple UEs the common beam is shared across a first downlink channel and a second downlink channel. In some examples, for each UE of the set of multiple UEs the common beam is shared across a first uplink channel and a second uplink channel. In some examples, the common DCI message includes a GC-DCI message.

Figure 7:
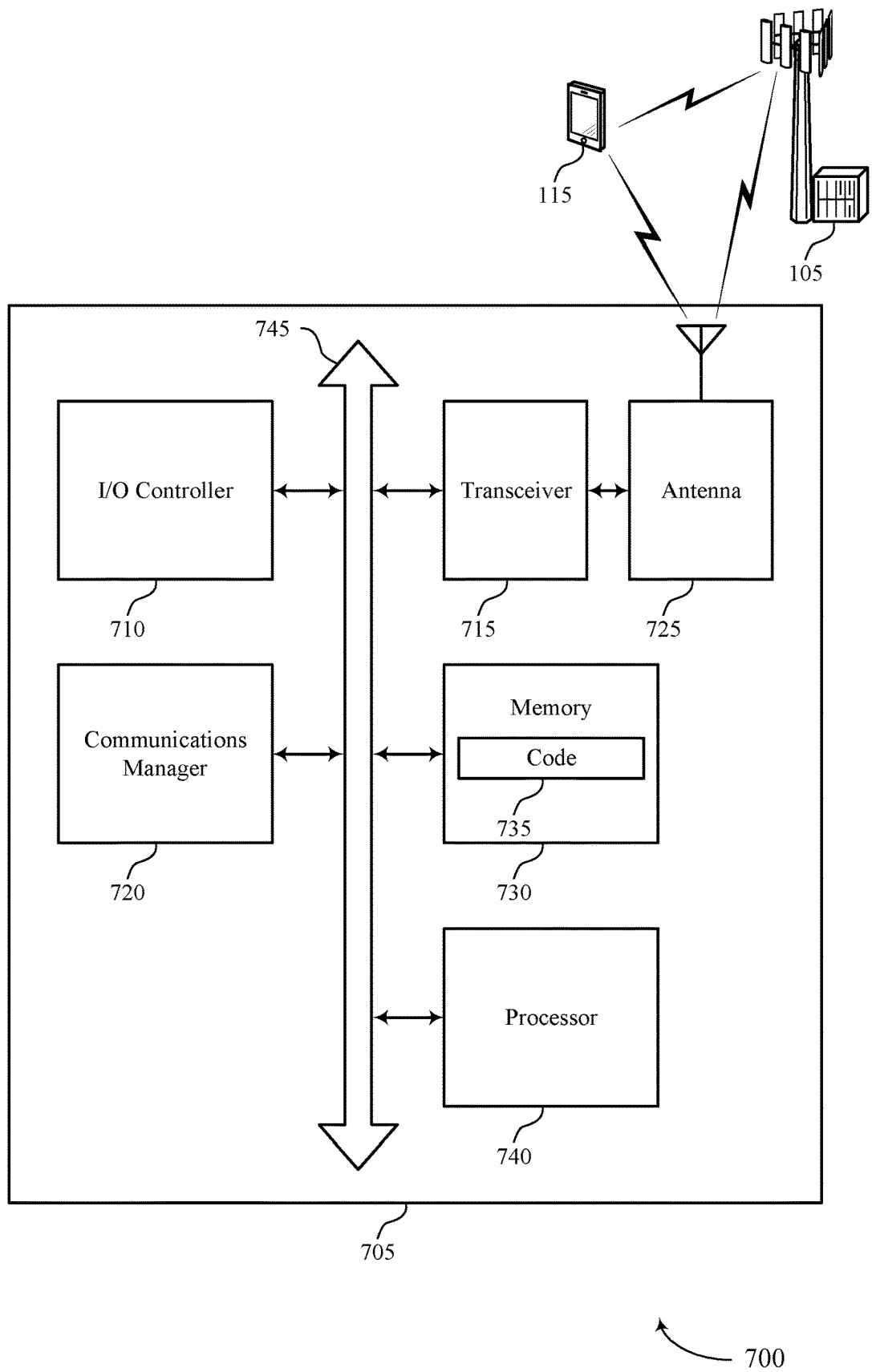
FIG. 7 shows a diagram of a system including a device that supports techniques for common beam updates indicated by common DCI in accordance with aspects of the present disclosure.

FIG. 7 shows a diagram of a system 700 including a device 705 that supports techniques for common beam updates indicated by common DCI in accordance with aspects of the present disclosure. The device 705 may be an example of or include the components of a device 405, a device 505, or a UE 115 as described herein. The device 705 may communicate wirelessly with one or more base stations 105, UEs 115, or any combination thereof. The device 705 may include components for bi-directional voice and data communications including components for transmitting and receiving communications, such as a communications manager 720, an input/output (I/O) controller 710, a transceiver 715, an antenna 725, a memory 730, code 735, and a processor 740. These components may be in electronic communication or otherwise coupled (e.g., operatively, communicatively, functionally, electronically, electrically) via one or more buses (e.g., a bus 745).

The I/O controller 710 may manage input and output signals for the device 705. The I/O controller 710 may also manage peripherals not integrated into the device 705. In some cases, the I/O controller 710 may represent a physical connection or port to an external peripheral. In some cases, the I/O controller 710 may utilize an operating system such as iOS®, ANDROID®, MS-DOS®, MS-WINDOWS®, OS/2®, UNIX®, LINUX®, or another known operating system. Additionally or alternatively, the I/O controller 710 may represent or interact with a modem, a keyboard, a mouse, a touchscreen, or a similar device. In some cases, the I/O controller 710 may be implemented as part of a processor, such as the processor 740. In some cases, a user may interact with the device 705 via the I/O controller 710 or via hardware components controlled by the I/O controller 710.

In some cases, the device 705 may include a single antenna 725. However, in some other cases, the device 705 may have more than one antenna 725, which may be capable of concurrently transmitting or receiving multiple wireless transmissions. The transceiver 715 may communicate bi-directionally, via the one or more antennas 725, wired, or wireless links as described herein. For example, the transceiver 715 may represent a wireless transceiver and may communicate bi-directionally with another wireless transceiver. The transceiver 715 may also include a modem to modulate the packets, to provide the modulated packets to one or more antennas 725 for transmission, and to demodulate packets received from the one or more antennas 725.

The transceiver 715, or the transceiver 715 and one or more antennas 725, may be an example of a transmitter 415, a transmitter 515, a receiver 410, a receiver 510, or any combination thereof or component thereof, as described herein.

The memory 730 may include random access memory (RAM) and read-only memory (ROM). The memory 730 may store computer-readable, computer-executable code 735 including instructions that, when executed by the processor 740, cause the device 705 to perform various functions described herein. The code 735 may be stored in a non-transitory computer-readable medium such as system memory or another type of memory. In some cases, the code 735 may not be directly executable by the processor 740 but may cause a computer (e.g., when compiled and executed) to perform functions described herein. In some cases, the memory 730 may contain, among other things, a basic I/O system (BIOS) which may control basic hardware or software operation such as the interaction with peripheral components or devices.

The processor 740 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 740 may be configured to operate a memory array using a memory controller. In some other cases, a memory controller may be integrated into the processor 740. The processor 740 may be configured to execute computer-readable instructions stored in a memory (e.g., the memory 730) to cause the device 705 to perform various functions (e.g., functions or tasks supporting techniques for common beam updates indicated by common DCI). For example, the device 705 or a component of the device 705 may include a processor 740 and memory 730 coupled with the processor 740, the processor 740 and memory 730 configured to perform various functions described herein.

The communications manager 720 may support wireless communication at a UE in accordance with examples as disclosed herein. For example, the communications manager 720 may be configured as or otherwise support a means for receiving, from a base station, a common DCI message indicating an update to a common beam which applies to a set of multiple UEs, where for each UE of the set of multiple UEs the common beam is shared across a set of multiple channels, a set of multiple reference signals, or both. The communications manager 720 may be configured as or otherwise support a means for receiving, via the common DCI message, an indication of the set of multiple UEs associated with the update to the common beam. The communications manager 720 may be configured as or otherwise support a means for performing at least one beam switching procedure to update the common beam at the UE based on receiving the common DCI message and the UE being included within the set of multiple UEs.

By including or configuring the communications manager 720 in accordance with examples as described herein, the device 705 may support techniques for updating common beams across a set of UEs 115 via a single common DCI message (e.g., GC-DCI message). In this regard, techniques described herein may thereby reduce control signaling overhead, reduce latency of common beam updates, and improve resource utilization in the wireless communications system.

In some examples, the communications manager 720 may be configured to perform various operations (e.g., receiving, monitoring, transmitting) using or otherwise in cooperation with the transceiver 715, the one or more antennas 725, or any combination thereof. Although the communications manager 720 is illustrated as a separate component, in some examples, one or more functions described with reference to the communications manager 720 may be supported by or performed by the processor 740, the memory 730, the code 735, or any combination thereof. For example, the code 735 may include instructions executable by the processor 740 to cause the device 705 to perform various aspects of techniques for common beam updates indicated by common DCI as described herein, or the processor 740 and the memory 730 may be otherwise configured to perform or support such operations.

Figure 8:
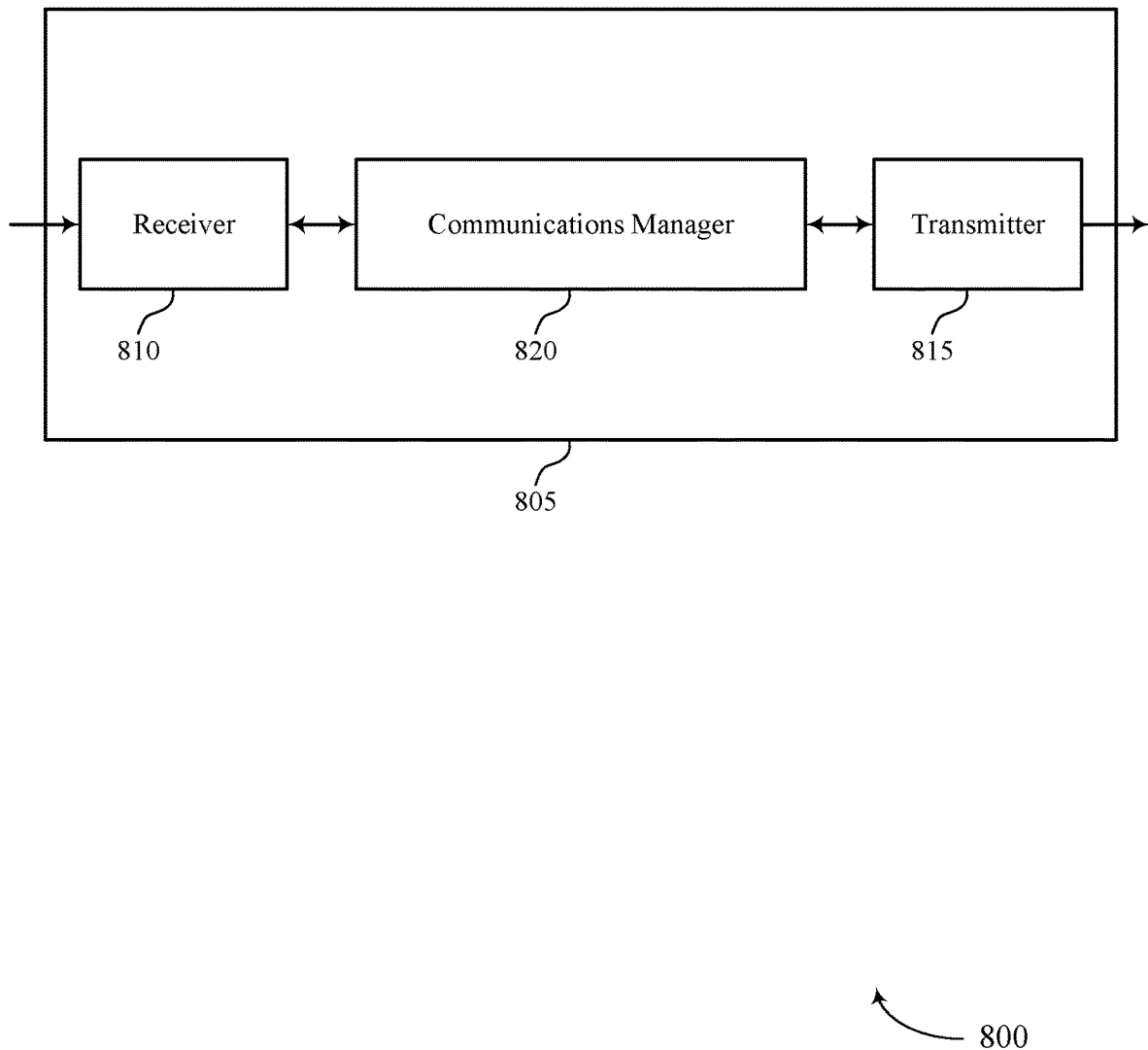
FIGS. 8 and 9 show block diagrams of devices that support techniques for common beam updates indicated by common DCI in accordance with aspects of the present disclosure.

FIG. 8 shows a block diagram 800 of a device 805 that supports techniques for common beam updates indicated by common DCI in accordance with aspects of the present disclosure. The device 805 may be an example of aspects of a base station 105 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for common beam updates indicated by common DCI). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for common beam updates indicated by common DCI). In some examples, the transmitter 815 may be co-located with a receiver 810 in a transceiver module. The transmitter 815 may utilize a single antenna or a set of multiple antennas.

The communications manager 820, the receiver 810, the transmitter 815, or various combinations thereof or various components thereof may be examples of means for performing various aspects of techniques for common beam updates indicated by common DCI as described herein. For example, the communications manager 820, the receiver 810, the transmitter 815, or various combinations or components thereof may support a method for performing one or more of the functions described herein.

In some examples, the communications manager 820, the receiver 810, the transmitter 815, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 820, the receiver 810, the transmitter 815, or various combinations or components thereof may be implemented in code (e.g., as communications management software or firmware) executed by a processor. If implemented in code executed by a processor, the functions of the communications manager 820, the receiver 810, the transmitter 815, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 820 may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communication at a base station in accordance with examples as disclosed herein. For example, the communications manager 820 may be configured as or otherwise support a means for transmitting a common DCI message indicating an update to a common beam which applies to a set of multiple UEs, where for each UE of the set of multiple UEs the common beam is shared across a set of multiple channels, a set of multiple reference signals, or both. The communications manager 820 may be configured as or otherwise support a means for transmitting, via the common DCI message, an indication of the set of multiple UEs associated with the update to the common beam. The communications manager 820 may be configured as or otherwise support a means for communicating with the set of multiple UEs based on transmitting the common DCI message.

By including or configuring the communications manager 820 in accordance with examples as described herein, the device 805 (e.g., a processor controlling or otherwise coupled with the receiver 810, the transmitter 815, the communications manager 820, or a combination thereof) may support techniques for updating common beams across a set of UEs 115 via a single common DCI message (e.g., GC-DCI message). In this regard, techniques described herein may thereby reduce control signaling overhead, reduce latency of common beam updates, and improve resource utilization in the wireless communications system.

Figure 9:
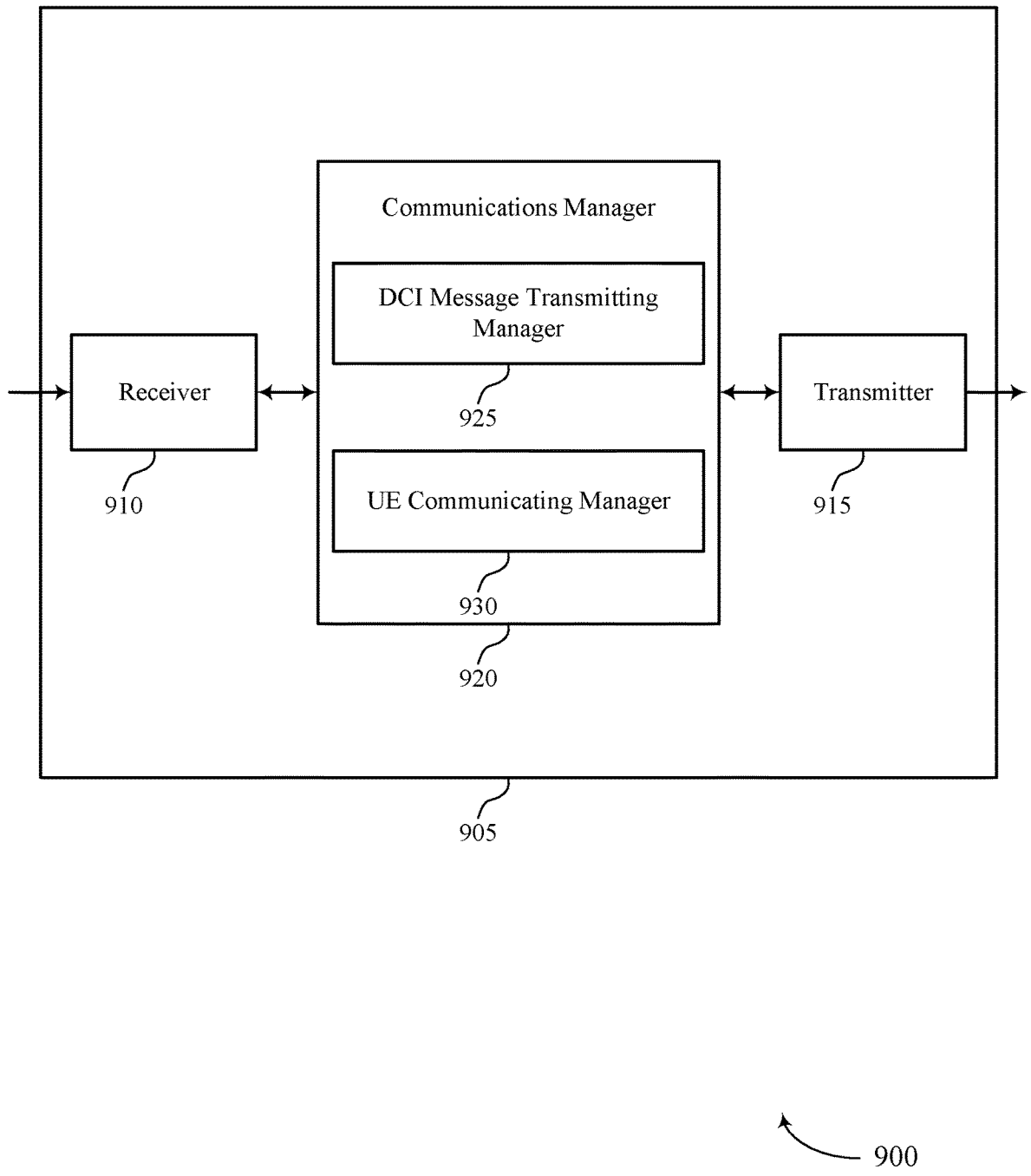

FIG. 9 shows a block diagram 900 of a device 905 that supports techniques for common beam updates indicated by common DCI in accordance with aspects of the present disclosure. The device 905 may be an example of aspects of a device 805 or a base station 105 as described herein. The device 905 may include a receiver 910, a transmitter 915, and a communications manager 920. The device 905 may also include a processor. Each of these components may be in communication with one another (e.g., via one or more buses).

The receiver 910 may provide a means for receiving information such as packets, user data, control information, or any combination thereof associated with various information channels (e.g., control channels, data channels, information channels related to techniques for common beam updates indicated by common DCI). Information may be passed on to other components of the device 905. The receiver 910 may utilize a single antenna or a set of multiple antennas.

The transmitter 915 may provide a means for transmitting signals generated by other components of the device 905. For example, the transmitter 915 may transmit information such as packets, user data, control information, or any combination thereof associated with various information channels (e.g., control channels, data channels, information channels related to techniques for common beam updates indicated by common DCI). In some examples, the transmitter 915 may be co-located with a receiver 910 in a transceiver module. The transmitter 915 may utilize a single antenna or a set of multiple antennas.

The device 905, or various components thereof, may be an example of means for performing various aspects of techniques for common beam updates indicated by common DCI as described herein. For example, the communications manager 920 may include a DCI message transmitting manager 925 a UE communicating manager 930, or any combination thereof. The communications manager 920 may be an example of aspects of a communications manager 820 as described herein. In some examples, the communications manager 920, or various components thereof, may be configured to perform various operations (e.g., receiving, monitoring, transmitting) using or otherwise in cooperation with the receiver 910, the transmitter 915, or both. For example, the communications manager 920 may receive information from the receiver 910, send information to the transmitter 915, or be integrated in combination with the receiver 910, the transmitter 915, or both to receive information, transmit information, or perform various other operations as described herein.

The communications manager 920 may support wireless communication at a base station in accordance with examples as disclosed herein. The DCI message transmitting manager 925 may be configured as or otherwise support a means for transmitting a common DCI message indicating an update to a common beam which applies to a set of multiple UEs, where for each UE of the set of multiple UEs the common beam is shared across a set of multiple channels, a set of multiple reference signals, or both. The DCI message transmitting manager 925 may be configured as or otherwise support a means for transmitting, via the common DCI message, an indication of the set of multiple UEs associated with the update to the common beam. The UE communicating manager 930 may be configured as or otherwise support a means for communicating with the set of multiple UEs based on transmitting the common DCI message.

Figure 10:
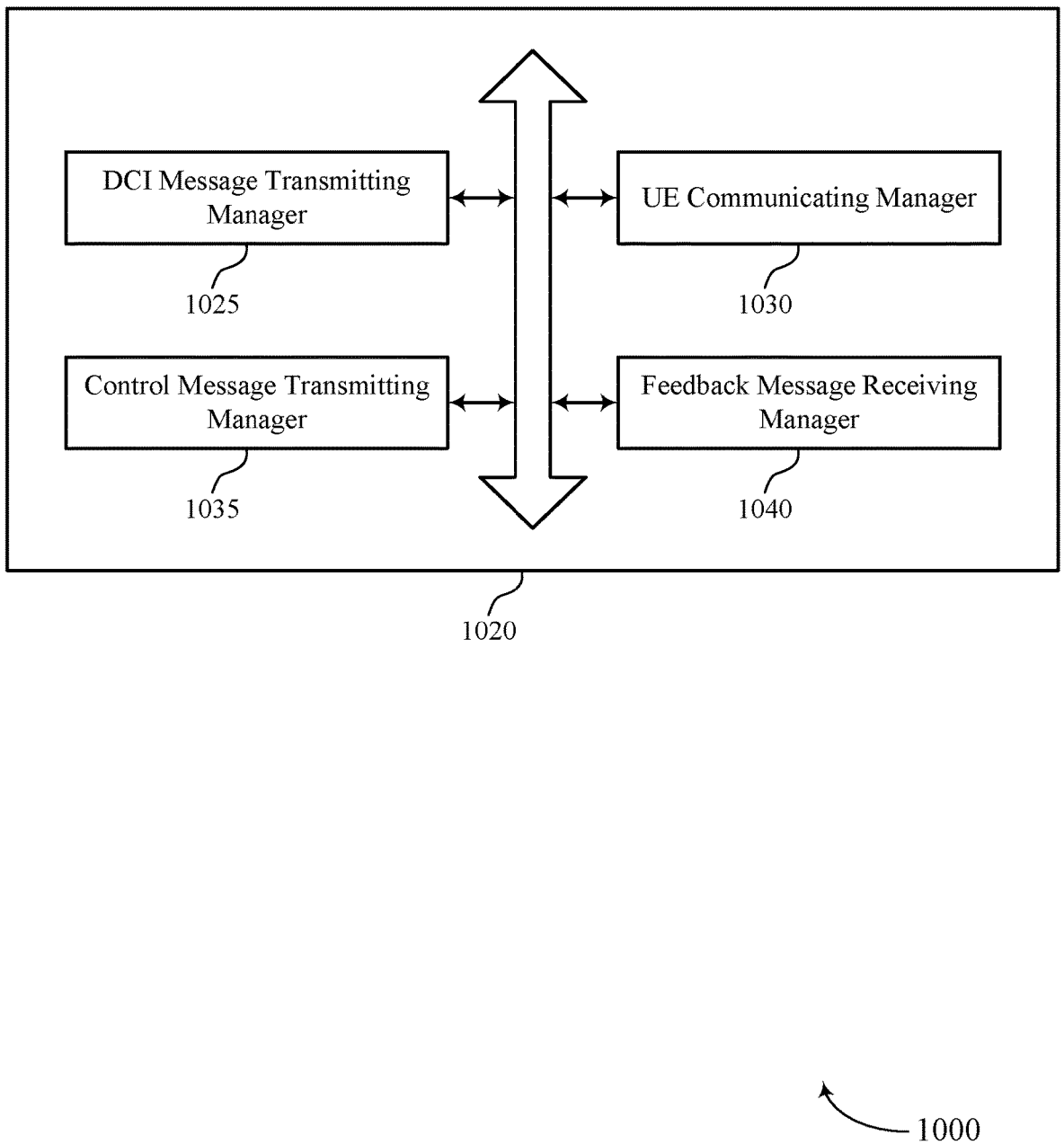
FIG. 10 shows a block diagram of a communications manager that supports techniques for common beam updates indicated by common DCI in accordance with aspects of the present disclosure.

FIG. 10 shows a block diagram 1000 of a communications manager 1020 that supports techniques for common beam updates indicated by common DCI in accordance with aspects of the present disclosure. The communications manager 1020 may be an example of aspects of a communications manager 820, a communications manager 920, or both, as described herein. The communications manager 1020, or various components thereof, may be an example of means for performing various aspects of techniques for common beam updates indicated by common DCI as described herein. For example, the communications manager 1020 may include a DCI message transmitting manager 1025, a UE communicating manager 1030, a control message transmitting manager 1035, a feedback message receiving manager 1040, or any combination thereof. Each of these components may communicate, directly or indirectly, with one another (e.g., via one or more buses).

The communications manager 1020 may support wireless communication at a base station in accordance with examples as disclosed herein. The DCI message transmitting manager 1025 may be configured as or otherwise support a means for transmitting a common DCI message indicating an update to a common beam which applies to a set of multiple UEs, where for each UE of the set of multiple UEs the common beam is shared across a set of multiple channels, a set of multiple reference signals, or both. In some examples, the DCI message transmitting manager 1025 may be configured as or otherwise support a means for transmitting, via the common DCI message, an indication of the set of multiple UEs associated with the update to the common beam. The UE communicating manager 1030 may be configured as or otherwise support a means for communicating with the set of multiple UEs based on transmitting the common DCI message.

In some examples, the DCI message transmitting manager 1025 may be configured as or otherwise support a means for transmitting, via the common DCI message, a TCI state associated with the update to the common beam at each UE of the set of multiple UEs, where communicating with the set of multiple UEs is based on the TCI state.

In some examples, the DCI message transmitting manager 1025 may be configured as or otherwise support a means for transmitting, via the common DCI message, a first TCI state associated with the update to the common beam at a first subset of UEs of the set of multiple UEs, where communicating with the first subset of UEs is based on the first TCI state. In some examples, the DCI message transmitting manager 1025 may be configured as or otherwise support a means for transmitting, via the common DCI message, a second TCI state associated with the update to the common beam at a second subset of UEs of the set of multiple UEs, where communicating with the second subset of UEs is based on the second TCI state.

In some examples, the DCI message transmitting manager 1025 may be configured as or otherwise support a means for transmitting, via the common DCI message, a bitmap indicating the first subset of UEs, the second subset of UEs, or both, where communicating with the set of multiple UEs is based on the bitmap. In some examples, the DCI message transmitting manager 1025 may be configured as or otherwise support a means for transmitting, via the common DCI message, a validity period associated with the update to the common beam and at least a subset of the set of multiple UEs. In some examples, the UE communicating manager 1030 may be configured as or otherwise support a means for communicating with the at least the subset of the set of multiple UEs for at least a duration of the validity period.

In some examples, the feedback message receiving manager 1040 may be configured as or otherwise support a means for receiving a feedback message to the base station in response to transmitting the common DCI message, where the duration of the validity period is based on transmitting the feedback message. In some examples, the duration of the validity period is based on transmitting the common DCI message.

In some examples, the control message transmitting manager 1035 may be configured as or otherwise support a means for transmitting, to the set of multiple UEs, a control message indicating a set of resources for transmitting feedback messages responsive to the common DCI message. In some examples, the feedback message receiving manager 1040 may be configured as or otherwise support a means for receiving, from a UE of the set of multiple UEs, a feedback message within the set of resources and in response to the common DCI message. In some examples, the control message includes the common DCI message, a MAC-CE message, a RRC message, or any combination thereof.

In some examples, the feedback message receiving manager 1040 may be configured as or otherwise support a means for receiving, from a UE of the set of multiple UEs, a feedback message indicating that the UE failed to successfully decode the common DCI message. In some examples, the DCI message transmitting manager 1025 may be configured as or otherwise support a means for transmitting an additional DCI message based on receiving the feedback message. In some examples, the additional DCI message includes an additional common DCI message. In some examples, the feedback message receiving manager 1040 may be configured as or otherwise support a means for receiving a feedback message from each UE of the set of multiple UEs indicating that each UE of the set of multiple UEs successfully decoded the common DCI message.

In some examples, the feedback message receiving manager 1040 may be configured as or otherwise support a means for receiving a feedback message from a first subset of UEs of the set of multiple UEs indicating that each UE of the first subset of UEs successfully decoded the common DCI message. In some examples, the feedback message receiving manager 1040 may be configured as or otherwise support a means for identifying that a second subset of UEs of the set of multiple UEs did not transmit a feedback message. In some examples, the DCI message transmitting manager 1025 may be configured as or otherwise support a means for transmitting an additional common DCI message based on the identifying.

In some examples, for each UE of the set of multiple UEs the common beam is shared across a downlink channel and an uplink channel. In some examples, for each UE of the set of multiple UEs the common beam is shared across a first downlink channel and a second downlink channel. In some examples, for each UE of the set of multiple UEs the common beam is shared across a first uplink channel and a second uplink channel. In some examples, the common DCI message includes a GC-DCI message.

Figure 11:
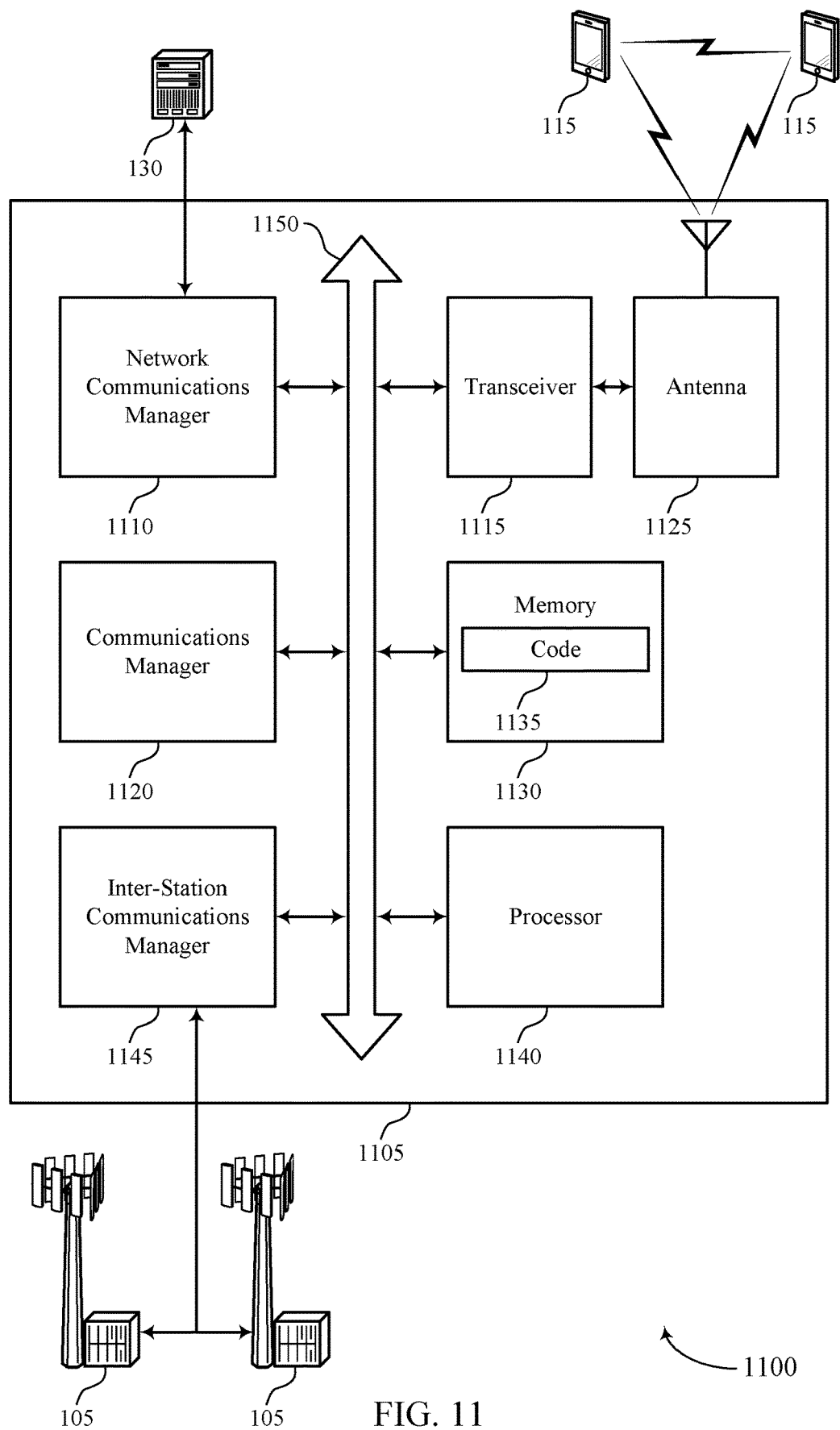
FIG. 11 shows a diagram of a system including a device that supports techniques for common beam updates indicated by common DCI in accordance with aspects of the present disclosure.

FIG. 11 shows a diagram of a system 1100 including a device 1105 that supports techniques for common beam updates indicated by common DCI in accordance with aspects of the present disclosure. The device 1105 may be an example of or include the components of a device 805, a device 905, or a base station 105 as described herein. The device 1105 may communicate wirelessly with one or more base stations 105, UEs 115, or any combination thereof. The device 1105 may include components for bi-directional voice and data communications including components for transmitting and receiving communications, such as a communications manager 1120, a network communications manager 1110, a transceiver 1115, an antenna 1125, a memory 1130, code 1135, a processor 1140, and an inter-station communications manager 1145. These components may be in electronic communication or otherwise coupled (e.g., operatively, communicatively, functionally, electronically, electrically) via one or more buses (e.g., a bus 1150).

The network communications manager 1110 may manage communications with a core network 130 (e.g., via one or more wired backhaul links). For example, the network communications manager 1110 may manage the transfer of data communications for client devices, such as one or more UEs 115.

In some cases, the device 1105 may include a single antenna 1125. However, in some other cases the device 1105 may have more than one antenna 1125, which may be capable of concurrently transmitting or receiving multiple wireless transmissions. The transceiver 1115 may communicate bi-directionally, via the one or more antennas 1125, wired, or wireless links as described herein. For example, the transceiver 1115 may represent a wireless transceiver and may communicate bi-directionally with another wireless transceiver. The transceiver 1115 may also include a modem to modulate the packets, to provide the modulated packets to one or more antennas 1125 for transmission, and to demodulate packets received from the one or more antennas 1125. The transceiver 1115, or the transceiver 1115 and one or more antennas 1125, may be an example of a transmitter 815, a transmitter 915, a receiver 810, a receiver 910, or any combination thereof or component thereof, as described herein.

The memory 1130 may include RAM and ROM. The memory 1130 may store computer-readable, computer-executable code 1135 including instructions that, when executed by the processor 1140, cause the device 1105 to perform various functions described herein. The code 1135 may be stored in a non-transitory computer-readable medium such as system memory or another type of memory. In some cases, the code 1135 may not be directly executable by the processor 1140 but may cause a computer (e.g., when compiled and executed) to perform functions described herein. In some cases, the memory 1130 may contain, among other things, a BIOS which may control basic hardware or software operation such as the interaction with peripheral components or devices.

The processor 1140 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In some other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting techniques for common beam updates indicated by common DCI). For example, the device 1105 or a component of the device 1105 may include a processor 1140 and memory 1130 coupled with the processor 1140, the processor 1140 and memory 1130 configured to perform various functions described herein.

The inter-station communications manager 1145 may manage communications with other base stations 105, and may include a controller or scheduler for controlling communications with UEs 115 in cooperation with other base stations 105. For example, the inter-station communications manager 1145 may coordinate scheduling for transmissions to UEs 115 for various interference mitigation techniques such as beamforming or joint transmission. In some examples, the inter-station communications manager 1145 may provide an X2 interface within an LTE/LTE-A wireless communications network technology to provide communication between base stations 105.

The communications manager 1120 may support wireless communication at a base station in accordance with examples as disclosed herein. For example, the communications manager 1120 may be configured as or otherwise support a means for transmitting a common DCI message indicating an update to a common beam which applies to a set of multiple UEs, where for each UE of the set of multiple UEs the common beam is shared across a set of multiple channels, a set of multiple reference signals, or both. The communications manager 1120 may be configured as or otherwise support a means for transmitting, via the common DCI message, an indication of the set of multiple UEs associated with the update to the common beam. The communications manager 1120 may be configured as or otherwise support a means for communicating with the set of multiple UEs based on transmitting the common DCI message.

By including or configuring the communications manager 1120 in accordance with examples as described herein, the device 1105 may support techniques for updating common beams across a set of UEs 115 via a single common DCI message (e.g., GC-DCI message). In this regard, techniques described herein may thereby reduce control signaling overhead, reduce latency of common beam updates, and improve resource utilization in the wireless communications system.

In some examples, the communications manager 1120 may be configured to perform various operations (e.g., receiving, monitoring, transmitting) using or otherwise in cooperation with the transceiver 1115, the one or more antennas 1125, or any combination thereof. Although the communications manager 1120 is illustrated as a separate component, in some examples, one or more functions described with reference to the communications manager 1120 may be supported by or performed by the processor 1140, the memory 1130, the code 1135, or any combination thereof. For example, the code 1135 may include instructions executable by the processor 1140 to cause the device 1105 to perform various aspects of techniques for common beam updates indicated by common DCI as described herein, or the processor 1140 and the memory 1130 may be otherwise configured to perform or support such operations.

Figure 12:
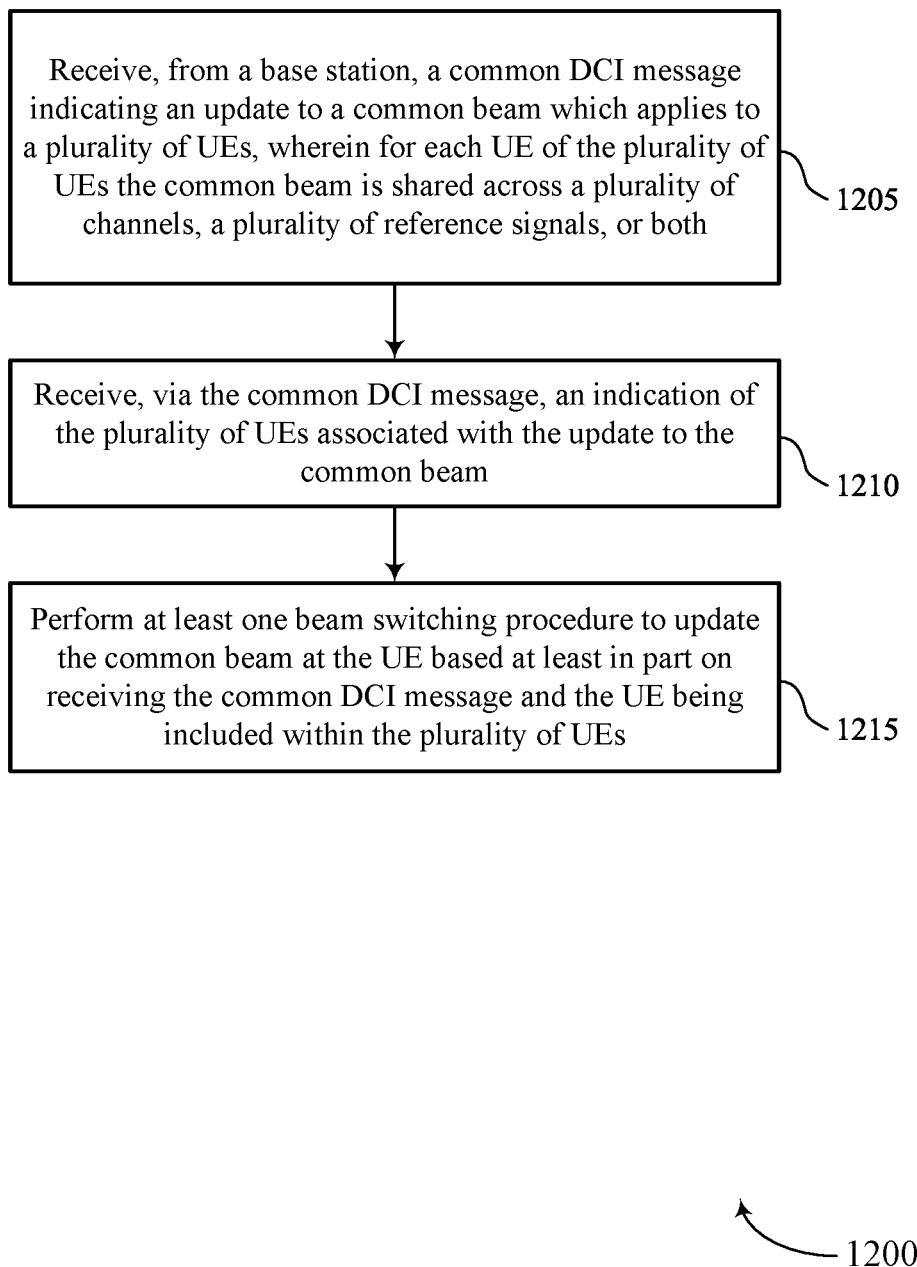
FIGS. 12 through 15 show flowcharts illustrating methods that support techniques for common beam updates indicated by common DCI in accordance with aspects of the present disclosure.

FIG. 12 shows a flowchart illustrating a method 1200 that supports techniques for common beam updates indicated by common DCI in accordance with aspects of the present disclosure. The operations of the method 1200 may be implemented by a UE or its components as described herein. For example, the operations of the method 1200 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1205, the method may include receiving, from a base station, a common DCI message indicating an update to a common beam which applies to a set of multiple UEs, where for each UE of the set of multiple UEs the common beam is shared across a set of multiple channels, a set of multiple reference signals, or both. The operations of 1205 may be performed in accordance with examples as disclosed herein. In some examples, aspects of the operations of 1205 may be performed by a DCI message receiving manager 625 as described with reference to FIG. 6.

At 1210, the method may include receiving, via the common DCI message, an indication of the set of multiple UEs associated with the update to the common beam. The operations of 1210 may be performed in accordance with examples as disclosed herein. In some examples, aspects of the operations of 1210 may be performed by a DCI message receiving manager 625 as described with reference to FIG. 6.

At 1215, the method may include performing at least one beam switching procedure to update the common beam at the UE based on receiving the common DCI message and the UE being included within the set of multiple UEs. The operations of 1215 may be performed in accordance with examples as disclosed herein. In some examples, aspects of the operations of 1215 may be performed by a beam switching procedure manager 630 as described with reference to FIG. 6.

Figure 13:
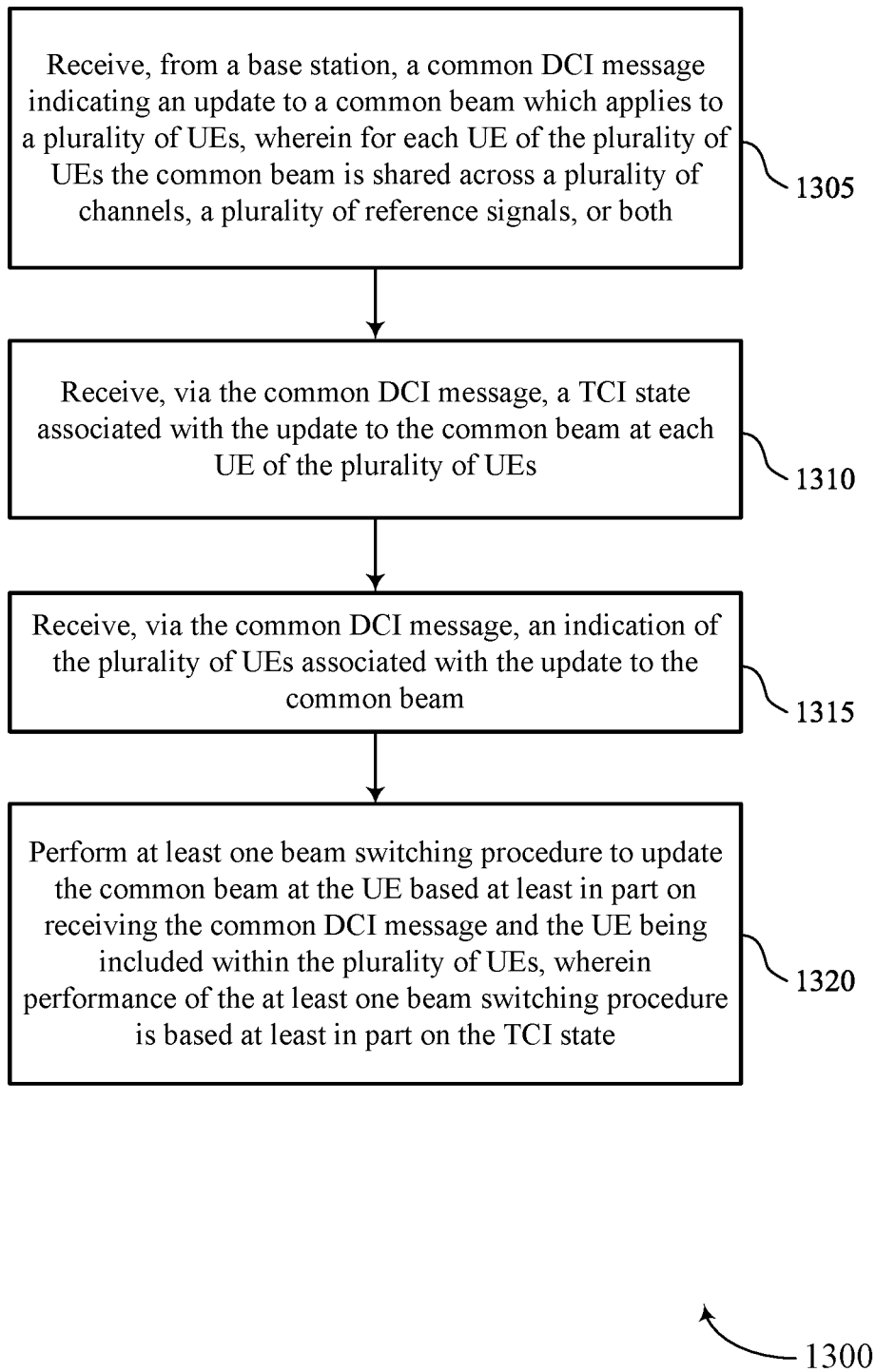

FIG. 13 shows a flowchart illustrating a method 1300 that supports techniques for common beam updates indicated by common DCI in accordance with aspects of the present disclosure. The operations of the method 1300 may be implemented by a UE or its components as described herein. For example, the operations of the method 1300 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1305, the method may include receiving, from a base station, a common DCI message indicating an update to a common beam which applies to a set of multiple UEs, where for each UE of the set of multiple UEs the common beam is shared across a set of multiple channels, a set of multiple reference signals, or both. The operations of 1305 may be performed in accordance with examples as disclosed herein. In some examples, aspects of the operations of 1305 may be performed by a DCI message receiving manager 625 as described with reference to FIG. 6.

At 1310, the method may include receiving, via the common DCI message, a TCI state associated with the update to the common beam at each UE of the set of multiple UEs. The operations of 1310 may be performed in accordance with examples as disclosed herein. In some examples, aspects of the operations of 1310 may be performed by a DCI message receiving manager 625 as described with reference to FIG. 6.

At 1315, the method may include receiving, via the common DCI message, an indication of the set of multiple UEs associated with the update to the common beam. The operations of 1315 may be performed in accordance with examples as disclosed herein. In some examples, aspects of the operations of 1315 may be performed by a DCI message receiving manager 625 as described with reference to FIG. 6.

At 1320, the method may include performing at least one beam switching procedure to update the common beam at the UE based on receiving the common DCI message and the UE being included within the set of multiple UEs, where performance of the at least one beam switching procedure is based on the TCI state. The operations of 1320 may be performed in accordance with examples as disclosed herein. In some examples, aspects of the operations of 1320 may be performed by a beam switching procedure manager 630 as described with reference to FIG. 6.

Figure 14:
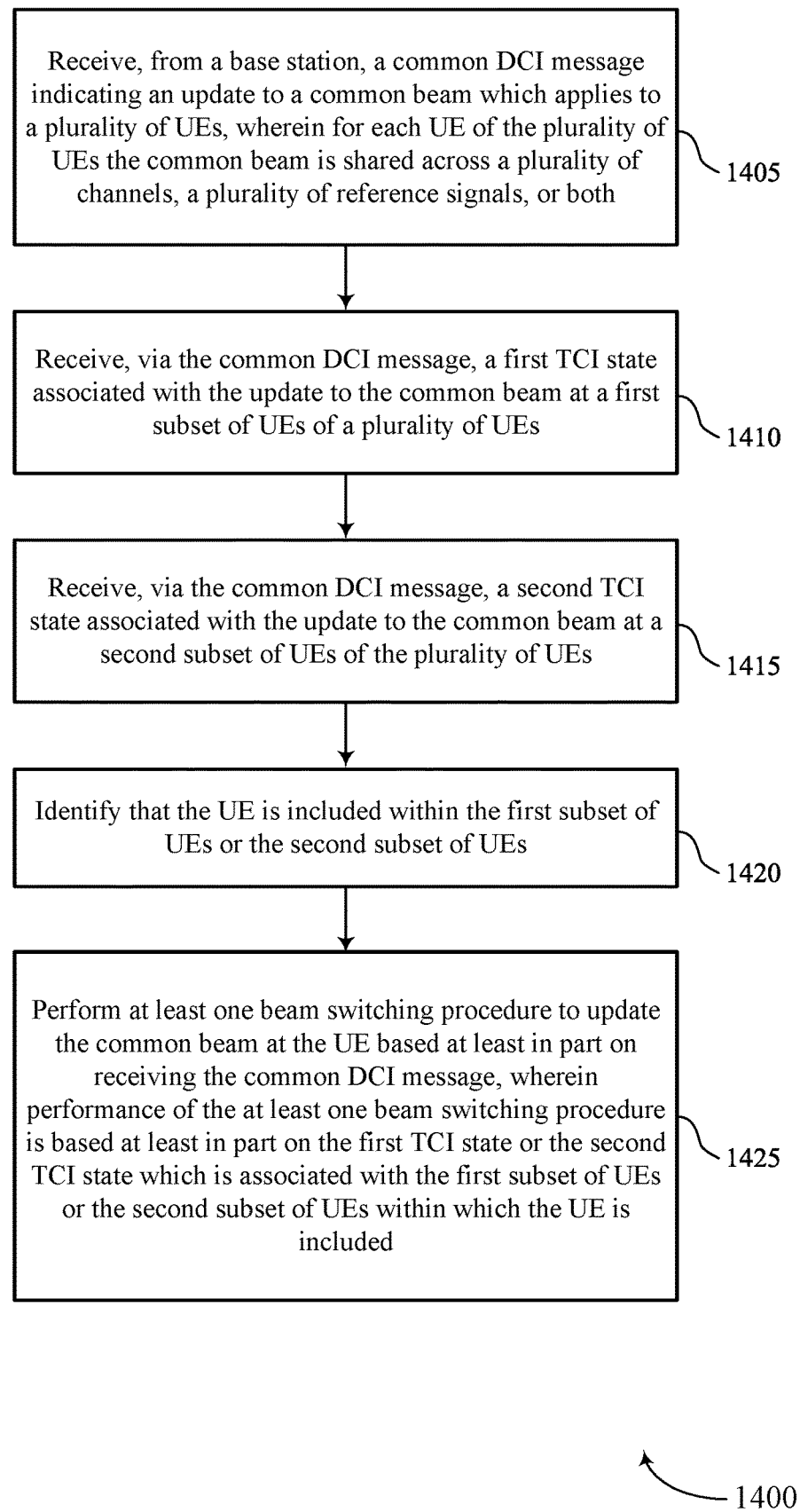

FIG. 14 shows a flowchart illustrating a method 1400 that supports techniques for common beam updates indicated by common DCI in accordance with aspects of the present disclosure. The operations of the method 1400 may be implemented by a UE or its components as described herein. For example, the operations of the method 1400 may be performed by a UE 115 as described with reference to FIGS. 1 through 7. In some examples, a UE may execute a set of instructions to control the functional elements of the UE to perform the described functions. Additionally or alternatively, the UE may perform aspects of the described functions using special-purpose hardware.

At 1405, the method may include receiving, from a base station, a common DCI message indicating an update to a common beam which applies to a set of multiple UEs, where for each UE of the set of multiple UEs the common beam is shared across a set of multiple channels, a set of multiple reference signals, or both. The operations of 1405 may be performed in accordance with examples as disclosed herein. In some examples, aspects of the operations of 1405 may be performed by a DCI message receiving manager 625 as described with reference to FIG. 6.

At 1410, the method may include receiving, via the common DCI message, a first TCI state associated with the update to the common beam at a first subset of UEs of a set of multiple UEs. The operations of 1410 may be performed in accordance with examples as disclosed herein. In some examples, aspects of the operations of 1410 may be performed by a DCI message receiving manager 625 as described with reference to FIG. 6.

At 1415, the method may include receiving, via the common DCI message, a second TCI state associated with the update to the common beam at a second subset of UEs of the set of multiple UEs. The operations of 1415 may be performed in accordance with examples as disclosed herein. In some examples, aspects of the operations of 1415 may be performed by a DCI message receiving manager 625 as described with reference to FIG. 6.

At 1420, the method may include identifying that the UE is included within the first subset of UEs or the second subset of UEs. The operations of 1420 may be performed in accordance with examples as disclosed herein. In some examples, aspects of the operations of 1420 may be performed by a beam switching procedure manager 630 as described with reference to FIG. 6.

At 1425, the method may include performing at least one beam switching procedure to update the common beam at the UE based on receiving the common DCI message, where performance of the at least one beam switching procedure is based on the first TCI state or the second TCI state which is associated with the first subset of UEs or the second subset of UEs within which the UE is included. The operations of 1425 may be performed in accordance with examples as disclosed herein. In some examples, aspects of the operations of 1425 may be performed by a beam switching procedure manager 630 as described with reference to FIG. 6.

Figure 15:
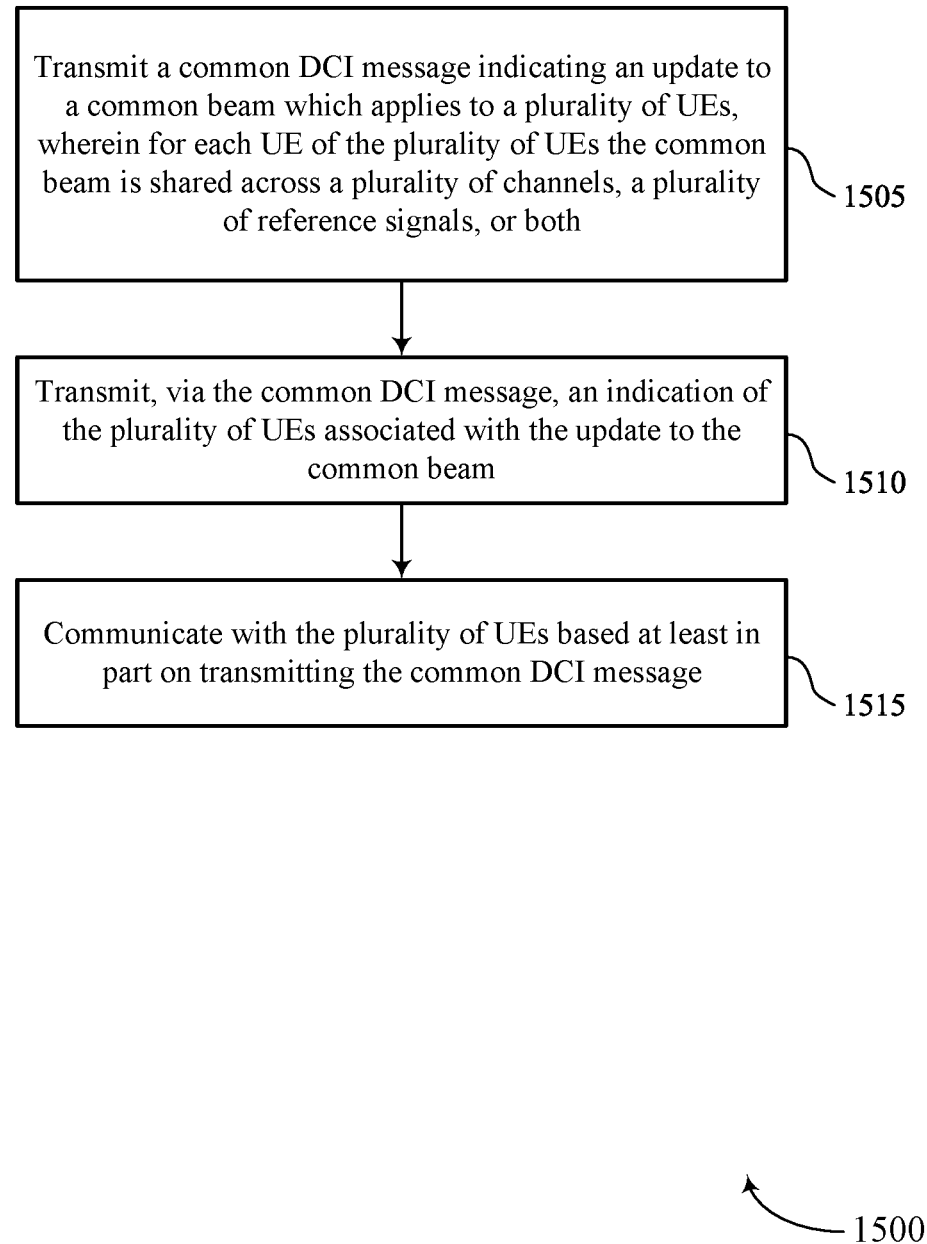

FIG. 15 shows a flowchart illustrating a method 1500 that supports techniques for common beam updates indicated by common DCI in accordance with aspects of the present disclosure. The operations of the method 1500 may be implemented by a base station or its components as described herein. For example, the operations of the method 1500 may be performed by a base station 105 as described with reference to FIGS. 1 through 3 and 8 through 11. In some examples, a base station may execute a set of instructions to control the functional elements of the base station to perform the described functions. Additionally or alternatively, the base station may perform aspects of the described functions using special-purpose hardware.

At 1505, the method may include transmitting a common DCI message indicating an update to a common beam which applies to a set of multiple UEs, where for each UE of the set of multiple UEs the common beam is shared across a set of multiple channels, a set of multiple reference signals, or both. The operations of 1505 may be performed in accordance with examples as disclosed herein. In some examples, aspects of the operations of 1505 may be performed by a DCI message transmitting manager 1025 as described with reference to FIG. 10.

At 1510, the method may include transmitting, via the common DCI message, an indication of the set of multiple UEs associated with the update to the common beam. The operations of 1510 may be performed in accordance with examples as disclosed herein. In some examples, aspects of the operations of 1510 may be performed by a DCI message transmitting manager 1025 as described with reference to FIG. 10.

At 1515, the method may include communicating with the set of multiple UEs based on transmitting the common DCI message. The operations of 1515 may be performed in accordance with examples as disclosed herein. In some examples, aspects of the operations of 1515 may be performed by a UE communicating manager 1030 as described with reference to FIG. 10.

The following provides an overview of aspects of the present disclosure:

Aspect 1: A method for wireless communication at a UE, comprising: receiving, from a base station, a common DCI message indicating an update to a common beam which applies to a plurality of UEs, wherein for each UE of the plurality of UEs the common beam is shared across a plurality of channels, a plurality of reference signals, or both; receiving, via the common DCI message, an indication of the plurality of UEs associated with the update to the common beam; and performing at least one beam switching procedure to update the common beam at the UE based at least in part on receiving the common DCI message and the UE being included within the plurality of UEs.

Aspect 2: The method of aspect 1, further comprising: receiving, via the common DCI message, a TCI state associated with the update to the common beam at each UE of the plurality of UEs, wherein performance of the at least one beam switching procedure is based at least in part on the TCI state.

Aspect 3: The method of any of aspects 1 through 2, further comprising: receiving, via the common DCI message, a first TCI state associated with the update to the common beam at a first subset of UEs of the plurality of UEs; receiving, via the common DCI message, a second TCI state associated with the update to the common beam at a second subset of UEs of the plurality of UEs; and identifying that the UE is included within the first subset of UEs or the second subset of UEs, wherein performance of the at least one beam switching procedure is based at least in part on the first TCI state or the second TCI state which is associated with the first subset of UEs or the second subset of UEs within which the UE is included.

Aspect 4: The method of aspect 3, further comprising: receiving, via the common DCI message, a bitmap indicating the first subset of UEs, the second subset of UEs, or both, wherein the identifying is based at least in part on the bitmap.

Aspect 5: The method of any of aspects 1 through 4, further comprising: receiving, via the common DCI message, a validity period associated with the update to the common beam and at least a subset of the plurality of UEs; and communicating with the base station using the common beam for at least a duration of the validity period and based at least in part on the UE being included within the at least the subset of the plurality of UEs.

Aspect 6: The method of aspect 5, further comprising: transmitting a feedback message to the base station in response to receiving the common DCI message, wherein the duration of the validity period is based at least in part on transmitting the feedback message.

Aspect 7: The method of any of aspects 5 through 6, wherein the duration of the validity period is based at least in part on receiving the common DCI message.

Aspect 8: The method of any of aspects 1 through 7, further comprising: receiving, from the base station, a control message indicating a set of resources for transmitting a feedback message responsive to the common DCI message; and transmitting, to the base station, the feedback message within the set of resources and in response to the common DCI message.

Aspect 9: The method of aspect 8, wherein the control message comprises the common DCI message, a MAC control element message, an RRC message, or any combination thereof.

Aspect 10: The method of any of aspects 1 through 9, further comprising: receiving an additional common DCI message indicating the update to the common beam; and transmitting, to the base station, a feedback message based at least in part on identifying that the UE failed to successfully decode the additional common DCI message, wherein the common DCI message is received in response to the feedback message.

Aspect 11: The method of any of aspects 1 through 10, further comprising: transmitting a feedback message to the base station based at least in part on identifying that the UE successfully decoded the common DCI message.

Aspect 12: The method of any of aspects 1 through 11, wherein for each UE of the plurality of UEs the common beam is shared across a downlink channel and an uplink channel.

Aspect 13: The method of any of aspects 1 through 12, wherein for each UE of the plurality of UEs the common beam is shared across a first downlink channel and a second downlink channel.

Aspect 14: The method of any of aspects 1 through 13, wherein for each UE of the plurality of UEs the common beam is shared across a first uplink channel and a second uplink channel.

Aspect 15: The method of any of aspects 1 through 14, wherein the common DCI message comprises a GC-DCI message.

Aspect 16: A method for wireless communication at a base station, comprising: transmitting a common DCI message indicating an update to a common beam which applies to a plurality of UEs, wherein for each UE of the plurality of UEs the common beam is shared across a plurality of channels, a plurality of reference signals, or both; transmitting, via the common DCI message, an indication of the plurality of UEs associated with the update to the common beam; and communicating with the plurality of UEs based at least in part on transmitting the common DCI message.

Aspect 17: The method of aspect 16, further comprising: transmitting, via the common DCI message, a TCI state associated with the update to the common beam at each UE of the plurality of UEs, wherein communicating with the plurality of UEs is based at least in part on the TCI state.

Aspect 18: The method of any of aspects 16 through 17, further comprising: transmitting, via the common DCI message, a first TCI state associated with the update to the common beam at a first subset of UEs of the plurality of UEs, wherein communicating with the first subset of UEs is based at least in part on the first TCI state; and transmitting, via the common DCI message, a second TCI state associated with the update to the common beam at a second subset of UEs of the plurality of UEs, wherein communicating with the second subset of UEs is based at least in part on the second TCI state.

Aspect 19: The method of aspect 18, further comprising: transmitting, via the common DCI message, a bitmap indicating the first subset of UEs, the second subset of UEs, or both, wherein communicating with the plurality of UEs is based at least in part on the bitmap.

Aspect 20: The method of any of aspects 16 through 19, further comprising: transmitting, via the common DCI message, a validity period associated with the update to the common beam and at least a subset of the plurality of UEs; and communicating with the at least the subset of the plurality of UEs for at least a duration of the validity period.

Aspect 21: The method of aspect 20, further comprising: receiving a feedback message to the base station in response to transmitting the common DCI message, wherein the duration of the validity period is based at least in part on transmitting the feedback message.

Aspect 22: The method of any of aspects 20 through 21, wherein the duration of the validity period is based at least in part on transmitting the common DCI message.

Aspect 23: The method of any of aspects 16 through 22, further comprising: transmitting, to the plurality of UEs, a control message indicating a set of resources for transmitting feedback messages responsive to the common DCI message; and receiving, from a UE of the plurality of UEs, a feedback message within the set of resources and in response to the common DCI message.

Aspect 24: The method of aspect 23, wherein the control message comprises the common DCI message, a MAC-CE message, an RRC message, or any combination thereof.

Aspect 25: The method of any of aspects 16 through 24, further comprising: receiving, from a UE of the plurality of UEs, a feedback message indicating that the UE failed to successfully decode the common DCI message; and transmitting an additional DCI message based at least in part on receiving the feedback message.

Aspect 26: The method of aspect 25, wherein the additional DCI message comprises an additional common DCI message.

Aspect 27: The method of any of aspects 16 through 26, further comprising: receiving a feedback message from each UE of the plurality of UEs indicating that each UE of the plurality of UEs successfully decoded the common DCI message.

Aspect 28: The method of any of aspects 16 through 27, further comprising: receiving a feedback message from a first subset of UEs of the plurality of UEs indicating that each UE of the first subset of UEs successfully decoded the common DCI message; identifying that a second subset of UEs of the plurality of UEs did not transmit a feedback message; and transmitting an additional common DCI message based at least in part on the identifying.

Aspect 29: The method of any of aspects 16 through 28, wherein for each UE of the plurality of UEs the common beam is shared across a downlink channel and an uplink channel.

Aspect 30: The method of any of aspects 16 through 29, wherein for each UE of the plurality of UEs the common beam is shared across a first downlink channel and a second downlink channel.

Aspect 31: The method of any of aspects 16 through 30, wherein for each UE of the plurality of UEs the common beam is shared across a first uplink channel and a second uplink channel.

Aspect 32: The method of any of aspects 16 through 31, wherein the common DCI message comprises a GC-DCI message.

Aspect 33: An apparatus for wireless communication at a UE, comprising a processor; memory coupled with the processor; and instructions stored in the memory and executable by the processor to cause the apparatus to perform a method of any of aspects 1 through 15.

Aspect 34: An apparatus for wireless communication at a UE, comprising at least one means for performing a method of any of aspects 1 through 15.

Aspect 35: A non-transitory computer-readable medium storing code for wireless communication at a UE, the code comprising instructions executable by a processor to perform a method of any of aspects 1 through 15.

Aspect 36: An apparatus for wireless communication at a base station, comprising a processor; memory coupled with the processor; and instructions stored in the memory and executable by the processor to cause the apparatus to perform a method of any of aspects 16 through 32.

Aspect 37: An apparatus for wireless communication at a base station, comprising at least one means for performing a method of any of aspects 16 through 32.

Aspect 38: A non-transitory computer-readable medium storing code for wireless communication at a base station, the code comprising instructions executable by a processor to perform a method of any of aspects 16 through 32.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for wireless communication at a user equipment (UE), comprising:
   receiving, from a base station, a common downlink control information message indicating an update to a common beam which applies to a plurality of UEs, wherein for each UE of the plurality of UEs the common beam is shared across a plurality of channels, a plurality of reference signals, or both;
   receiving, via the common downlink control information message, an indication of the plurality of UEs associated with the update to the common beam; and
   performing at least one beam switching procedure to update the common beam at the UE based at least in part on receiving the common downlink control information message and the UE being included within the plurality of UEs.

2. The method of claim 1, further comprising:
   receiving, via the common downlink control information message, a transmission-configuration indicator state associated with the update to the common beam at each UE of the plurality of UEs, wherein performance of the at least one beam switching procedure is based at least in part on the transmission-configuration indicator state.

3. The method of claim 1, further comprising:
   receiving, via the common downlink control information message, a first transmission-configuration indicator state associated with the update to the common beam at a first subset of UEs of the plurality of UEs;
   receiving, via the common downlink control information message, a second transmission-configuration indicator state associated with the update to the common beam at a second subset of UEs of the plurality of UEs; and
   identifying that the UE is included within the first subset of UEs or the second subset of UEs, wherein performance of the at least one beam switching procedure is based at least in part on the first transmission-configuration indicator state or the second transmission-configuration indicator state which is associated with the first subset of UEs or the second subset of UEs within which the UE is included.

4. The method of claim 3, further comprising:
   receiving, via the common downlink control information message, a bitmap indicating the first subset of UEs, the second subset of UEs, or both, wherein the identifying is based at least in part on the bitmap.

5. The method of claim 1, further comprising:
   receiving, via the common downlink control information message, a validity period associated with the update to the common beam and at least a subset of the plurality of UEs; and
   communicating with the base station using the common beam for at least a duration of the validity period and based at least in part on the UE being included within the at least the subset of the plurality of UEs.

6. The method of claim 5, further comprising:
   transmitting a feedback message to the base station in response to receiving the common downlink control information message, wherein the duration of the validity period is based at least in part on transmitting the feedback message.

7. The method of claim 5, wherein the duration of the validity period is based at least in part on receiving the common downlink control information message.

8. The method of claim 1, further comprising:
   receiving, from the base station, a control message indicating a set of resources for transmitting a feedback message responsive to the common downlink control information message; and
   transmitting, to the base station, the feedback message within the set of resources and in response to the common downlink control information message.

9. The method of claim 8, wherein the control message comprises the common downlink control information message, a medium access control (MAC) control element message, a radio resource control message, or any combination thereof.

10. The method of claim 1, further comprising:
    receiving an additional common downlink control information message indicating the update to the common beam; and
    transmitting, to the base station, a feedback message based at least in part on identifying that the UE failed to successfully decode the additional common downlink control information message, wherein the common downlink control information message is received in response to the feedback message.

11. The method of claim 1, further comprising:
    transmitting a feedback message to the base station based at least in part on identifying that the UE successfully decoded the common downlink control information message.

12. The method of claim 1, wherein for each UE of the plurality of UEs the common beam is shared across a downlink channel and an uplink channel.

13. The method of claim 1, wherein for each UE of the plurality of UEs the common beam is shared across a first downlink channel and a second downlink channel.

14. The method of claim 1, wherein for each UE of the plurality of UEs the common beam is shared across a first uplink channel and a second uplink channel.

15. The method of claim 1, wherein the common downlink control information message comprises a group-common downlink control information message.

16. A method for wireless communication at a base station, comprising:
    transmitting a common downlink control information message indicating an update to a common beam which applies to a plurality of user equipments (UEs), wherein for each UE of the plurality of UEs the common beam is shared across a plurality of channels, a plurality of reference signals, or both;
    transmitting, via the common downlink control information message, an indication of the plurality of UEs associated with the update to the common beam; and
    communicating with the plurality of UEs based at least in part on transmitting the common downlink control information message.

17. The method of claim 16, further comprising:
transmitting, via the common downlink control information message, a transmission-configuration indicator state associated with the update to the common beam at each UE of the plurality of UEs, wherein communicating with the plurality of UEs is based at least in part on the transmission-configuration indicator state.

18. The method of claim 16, further comprising:
transmitting, via the common downlink control information message, a first transmission-configuration indicator state associated with the update to the common beam at a first subset of UEs of the plurality of UEs, wherein communicating with the first subset of UEs is based at least in part on the first transmission-configuration indicator state; and
transmitting, via the common downlink control information message, a second transmission-configuration indicator state associated with the update to the common beam at a second subset of UEs of the plurality of UEs, wherein communicating with the second subset of UEs is based at least in part on the second transmission-configuration indicator state.

19. The method of claim 18, further comprising:
transmitting, via the common downlink control information message, a bitmap indicating the first subset of UEs, the second subset of UEs, or both, wherein communicating with the plurality of UEs is based at least in part on the bitmap.

20. The method of claim 16, further comprising:
transmitting, via the common downlink control information message, a validity period associated with the update to the common beam and at least a subset of the plurality of UEs; and
communicating with the at least the subset of the plurality of UEs for at least a duration of the validity period.

21. The method of claim 20, further comprising:
receiving a feedback message to the base station in response to transmitting the common downlink control information message, wherein the duration of the validity period is based at least in part on transmitting the feedback message.

22. The method of claim 20, wherein the duration of the validity period is based at least in part on transmitting the common downlink control information message.

23. The method of claim 16, further comprising:
transmitting, to the plurality of UEs, a control message indicating a set of resources for transmitting feedback messages responsive to the common downlink control information message; and
receiving, from a UE of the plurality of UEs, a feedback message within the set of resources and in response to the common downlink control information message.

24. The method of claim 23, wherein the control message comprises the common downlink control information message, a medium access control (MAC) control element message, a radio resource control message, or any combination thereof.

25. The method of claim 16, further comprising:
receiving, from a UE of the plurality of UEs, a feedback message indicating that the UE failed to successfully decode the common downlink control information message; and
transmitting an additional downlink control information message based at least in part on receiving the feedback message.

26. The method of claim 25, wherein the additional downlink control information message comprises an additional common downlink control information message.

27. The method of claim 16, further comprising:
receiving a feedback message from each UE of the plurality of UEs indicating that each UE of the plurality of UEs successfully decoded the common downlink control information message.

28. The method of claim 16, further comprising:
receiving a feedback message from a first subset of UEs of the plurality of UEs indicating that each UE of the first subset of UEs successfully decoded the common downlink control information message;
identifying that a second subset of UEs of the plurality of UEs did not transmit the feedback message; and
transmitting an additional common downlink control information message based at least in part on the identifying.

29. An apparatus for wireless communication at a user equipment (UE), comprising:
at least one processor;
at least one memory coupled with the at least one processor; and
instructions stored in the at least one memory and executable by the at least one processor to cause the apparatus to:
receive, from a base station, a common downlink control information message indicating an update to a common beam which applies to a plurality of UEs, wherein for each UE of the plurality of UEs the common beam is shared across a plurality of channels, a plurality of reference signals, or both;
receive, via the common downlink control information message, an indication of the plurality of UEs associated with the update to the common beam; and
perform at least one beam switching procedure to update the common beam at the UE based at least in part on receiving the common downlink control information message and the UE being included within the plurality of UEs.

30. An apparatus for wireless communication at a base station, comprising:
at least one processor;
at least one memory coupled with the at least one processor; and
instructions stored in the at least one memory and executable by the at least one processor to cause the apparatus to:
transmit a common downlink control information message indicating an update to a common beam which applies to a plurality of user equipments (UEs), wherein for each UE of the plurality of UEs the common beam is shared across a plurality of channels, a plurality of reference signals, or both;
transmit, via the common downlink control information message, an indication of the plurality of UEs associated with the update to the common beam; and
communicate with the plurality of UEs based at least in part on transmitting the common downlink control information message.

* * * * *